US012580183B2

(12) United States Patent
Hersam et al.

(10) Patent No.: US 12,580,183 B2
(45) Date of Patent: *Mar. 17, 2026

(54) CONFORMAL PICKERING EMULSION GRAPHENE COATINGS FOR ELECTRODE MATERIALS AND FORMING METHODS APPLICATIONS OF SAME

(71) Applicant: NORTHWESTERN UNIVERSITY, Evanston, IL (US)

(72) Inventors: Mark C. Hersam, Wilmette, IL (US); Kyu-Young Park, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 463 days.

This patent is subject to a terminal disclaimer.

(21) Appl. No.: 17/919,592

(22) PCT Filed: Apr. 22, 2021

(86) PCT No.: PCT/US2021/028556
§ 371 (c)(1),
(2) Date: Oct. 18, 2022

(87) PCT Pub. No.: WO2021/225789
PCT Pub. Date: Nov. 11, 2021

(65) Prior Publication Data
US 2023/0187615 A1 Jun. 15, 2023

Related U.S. Application Data

(60) Provisional application No. 63/019,552, filed on May 4, 2020.

(51) Int. Cl.
*H01M 4/36* (2006.01)
*C01G 53/42* (2025.01)
(Continued)

(52) U.S. Cl.
CPC ............ *H01M 4/366* (2013.01); *C01G 53/42* (2013.01); *H01M 4/525* (2013.01); *H01M 4/625* (2013.01);
(Continued)

(58) Field of Classification Search
CPC ..................................................... H01M 4/366
See application file for complete search history.

(56) References Cited

U.S. PATENT DOCUMENTS

| | | | |
|---|---|---|---|
| 8,691,335 B2 | 4/2014 | Miller | |
| 8,691,441 B2 | 4/2014 | Zhamu et al. | |

(Continued)

FOREIGN PATENT DOCUMENTS

| | | |
|---|---|---|
| CN | 105762345 A | 7/2016 |
| EP | 1702375 B1 | 4/2013 |

(Continued)

OTHER PUBLICATIONS

Armand, M. & Tarascon, J. M. Building better batteries. Nature 451, 652-657 (2008).

(Continued)

*Primary Examiner* — Khanh T Nguyen
(74) *Attorney, Agent, or Firm* — troutman pepper locke; Tim Tingkang Xia, Esq.

(57) ABSTRACT

A method for fabricating a composite material includes forming an emulsion mixture of active material particles and graphene emulsion droplets containing immiscible first and second solvents and a solid-state emulsifier of graphene, wherein the first and second solvents are adapted such that the second solvent resides in an interior of the graphene emulsion droplets with the first solvent as an exterior solvent, and the active material particles reside in the interior of the emulsion droplets; wherein a boiling point of the second solvent is lower than that of the first solvent; and (Continued)

Thicker thickness

⬤ Active particle • Carbon black ⬤ Coated active particle drying the emulsion mixture with subsequent evaporation of the second solvent and the first solvent through fractional distillation to form the composite material having each surface of the active material particles conformally coated with said graphene.

21 Claims, 31 Drawing Sheets

(51) Int. Cl.
    H01M 4/525          (2010.01)
    H01M 4/62          (2006.01)
(52) U.S. Cl.
    CPC ...... *C01P 2002/52* (2013.01); *C01P 2002/72* (2013.01); *C01P 2002/82* (2013.01); *C01P 2002/85* (2013.01); *C01P 2002/88* (2013.01); *C01P 2004/02* (2013.01); *C01P 2004/03* (2013.01); *C01P 2004/04* (2013.01); *C01P 2004/80* (2013.01); *C01P 2006/40* (2013.01)

(56)                References Cited

U.S. PATENT DOCUMENTS

| 2009/0181254 | A1 | 7/2009 | White et al. |
| 2010/0143798 | A1 | 6/2010 | Zhamu et al. |
| 2017/0233250 | A1 | 8/2017 | Cairns et al. |
| 2017/0338472 | A1* | 11/2017 | Zhamu .................. H01M 4/366 |
| 2018/0006299 | A1 | 1/2018 | Daigle et al. |

FOREIGN PATENT DOCUMENTS

| JP | 2018-505521 | A | 2/2018 |
| JP | 2020-508541 | A | 3/2020 |
| KR | 10-2016-0137820 | A | 12/2016 |
| KR | 20190038548 | A | 4/2019 |
| KR | 20190114994 | A | 10/2019 |
| WO | 2014194261 | A2 | 12/2014 |
| WO | 2015184155 | A1 | 12/2015 |
| WO | 2018217263 | A2 | 11/2018 |
| WO | 2019135094 | A1 | 7/2019 |

OTHER PUBLICATIONS

Lu, L., Han, X., Li, J., Hua, J. & Ouyang, M. A review on the key issues for lithium-ion battery management in electric vehicles. J. Power Sources 226, 272-288 (2013).

Lee, J. et al. Reversible Mn2+/Mn4+ double redox in lithium-excess cathode materials. Nature 556, 185-190 (2018).

Grimaud, A., Hong, W. T., Shao-Horn, Y. & Tarascon, J. M. Anionic redox processes for electrochemical devices. Nat. Mater. 15, 121 (2016).

Arai, H., Okada, S., Sakurai, Y. & Yamaki, J.-i. Reversibility of LiNiO2 cathode. Solid State Ion. 95, 275-282 (1997).

Etacheri, V., Marom, R., Elazari, R., Salitra, G. & Aurbach, D. Challenges in the development of advanced Li-ion batteries: a review. Energy Environ. Sci. 4, 3243-3262 (2011).

Manthiram, A., Knight, J. C., Myung, S.-T., Oh, S.-M. & Sun, Y.-K. Nickel-rich and lithium-rich layered oxide cathodes: Progress and perspectives. Adv. Energy Mater. 6, 1501010 (2016).

Kim, J. et al. Prospect and reality of Ni-rich cathode for commercialization. Adv. Energy Mater. 8, 1702028 (2018).

Lee, J. et al. Unlocking the potential of cation-disordered oxides for rechargeable lithium batteries. Science 343, 519-522 (2014).

Zheng, H., Tan, L., Liu, G., Song, X. & Battaglia, V. S. Calendering effects on the physical and electrochemical properties of Li[Ni1/3Mn1/3Co1/3]02 cathode. J. Power Sources 208, 52-57 (2012).

Ebner, M., Geldmacher, F., Marone, F., Stampanoni, M. & Wood, V. X-ray tomography of porous, transition metal oxide based lithium ion battery electrodes. Adv. Energy Mater. 3, 845-850 (2013).

Jabbour, L., Bongiovanni, R., Chaussy, D., Gerbaldi, C. & Beneventi, D. Cellulose-based Li-ion batteries: a review. Cellulose 20, 1523-1545 (2013).

Gaines, L. & Cuenca, R. Costs of lithium-ion batteries for vehicles. (Argonne National Lab., IL, US, 2000).

Dominko, R. et al. The role of carbon black distribution in cathodes for Li ion batteries. J. Power Sources 119-121, 770-773 (2003).

Li, Y. et al. Effects of particle size, electronic connectivity, and incoherent nanoscale domains on the sequence of lithiation in LiFePO4 porous electrodes. Adv. Mater. 27, 6591-6597 (2015).

Singh, M., Kaiser, J. & Hahn, H. Thick electrodes for high energy lithium ion batteries. J. Electrochem. Soc. 162, A1196-A1201 (2015).

Lee, B.-S. et al. Analysis of rate-limiting factors in thick electrodes for electric vehicle applications. J. Electrochem. Soc. 165, A525-A533 (2018).

Ender, M., Joos, J., Carraro, T. & Ivers-Tiffée, E. Three-dimensional reconstruction of a composite cathode for lithium-ion cells. Electrochem. Commun. 13, 166-168 (2011).

Choi, W., Lahiri, I., Seelaboyina, R. & Kang, Y. S. Synthesis of graphene and its applications: A review. Crit, Rev. Solid State 35, 52-71 (2010).

Yi, M. & Shen, Z. A review on mechanical exfoliation for the scalable production of graphene. J. Mater. Chem. A 3, 11700-11715 (2015).

Kucinskis, G., Bajars, G. & Kleperis, J. Graphene in lithium ion battery cathode materials: A review. J. Power Sources 240, 66-79 (2013).

Chabot, V. et al. A review of graphene and graphene oxide sponge: material synthesis and applications to energy and the environment. Energy Environ. Sci. 7, 1564-1596 (2014).

Zhu, N. et al. Graphene as a conductive additive to enhance the high-rate capabilities of electrospun Li4Ti5O12 for lithium-ion batteries. Electrochim. Acta 55, 5813-5818 (2010).

Su, F.-Y. et al. Could graphene construct an effective conducting network in a high-power lithium ion battery? Nano Energy 1, 429-439 (2012).

Bi, H. et al. Study of LiFePO4 cathode modified by graphene sheets for high-performance lithium ion batteries. Electrochim. Acta 88, 414-420 (2013).

Belyaeva, L. A., van Deursen, P. M. G., Barbetsea, K. I. & Schneider, G. F. Hydrophilicity of graphene in water through transparency to polar and dispersive interactions. Adv. Mater. 30, 1703274 (2018).

Li, Z. et al. Effect of airborne contaminants on the wettability of supported graphene and graphite. Nat. Mater. 12, 925-931 (2013).

Liang, Y. T. & Hersam, M. C. Highly concentrated graphene solutions via polymer enhanced solvent exfoliation and terative solvent exchange. J. Am. Chem. Soc. 132, 17661-17663 (2010).

Kim, J. et al. Graphene oxide sheets at interfaces. J. Am. Chem. Soc. 132, 8180-8186 (2010).

Kim, J.-W., Lee, D., Shum, H. C. & Weitz, D. A. Colloid surfactants for emulsion stabilization. Adv. Mater. 20, 3239-3243 (2008).

Aggour, Y. A. Thermal decomposition behaviour of ethyl cellulose grafted copolymers in homogeneous media. J. Mater. Sci. 35, 1623-1627 (2000).

Nan, H. Y. et al. The thermal stability of graphene in air investigated by Raman spectroscopy. J. Raman Spectrosc. 44, 1018-1021 (2013).

Secor, E. B. et al. Enhanced conductivity, adhesion, and environmental stability of printed graphene inks with nitrocellulose. Chem. Mater. 29, 2332-2340 (2017).

Qiu, X.-Y. et al. Reprint of "Investigation of layered LiNi1/3Co1/3Mn1/3O2 cathode of lithium ion battery by electrochemical impedance spectroscopy". J. Electroanal. Chem. 688, 393-402 (2013).

Du, K., Huang, J., Cao, Y., Peng, Z. & Hu, G. Study of effects on LiNi0.8Co0.15Al0.05O2 cathode by LiNi1/3Co1/3Mn1/3O2 coating for lithium ion batteries. J. All. Compd. 574, 377-382 (2013).

Lee, M.-J. et al. The role of nanoscale-range vanadium treatment in LiNi0.8Co0.15Al0.05O2 cathode materials for Li-ion batteries at elevated temperatures. J. Mater. Chem. A 3, 13453-13460 (2015).

Sharifi-Asl, S. et al. Anti-oxygen leaking LiCoO2. Adv. Funct. Mater. 29, 1901110 (2019).

(56) References Cited

OTHER PUBLICATIONS

Zheng, H., Li, J., Song, X., Liu, G. & Battaglia, V. S. A comprehensive understanding of electrode thickness effects on the electrochemical performances of Li-ion battery cathodes. Electrochim. Acta 71, 258-265 (2012).

Liu, M.-H., Jen, C.-W., Chen, J.-M. & Liao, S.-C. Improved electrochemical performance of Ni-rich cathode materials via Al gradient doping. Int. J. Electrochem. Sci. 13, 4350-4366 (2018).

Vu, D.-L., Choi, J.-Y., Kim, W.-B., Lee, J. J. & Lee, J.-W. Layered LiNi0.8Co0.1Mn0.1O2 prepared through calcination in air with preoxidized precursor. J. Electrochem. Soc. 164, A2670-A2676 (2017).

Zheng, J., Kan, W. H. & Manthiram, A. Role of Mn content on the electrochemical properties of nickel-rich layered LiNi0.8—xCo0.1Mn0.1+xO2 (0.0≤x≤0.08) cathodes for lithium-ion batteries. ACS Appl. Mater. 7, 6926-6934 (2015).

Yoon, S. et al. Method of preparation for particle growth enhancement of LiNi0.8Co0.15Al0.05O2. Electrochem. Solid State Lett. 12, A211-A214 (2009).

Liang, M. et al. Improved performances of LiNi0.8Co0.15Al0.05O2 material employing NaAlO2 as a new aluminum source. ACS Appl. Mater. 9, 38567-38574 (2017).

Vu, D.-L. & Lee, J.-w. Properties of LiNi0.8Co0.1Mn0.1O2 as a high energy cathode material for lithium-ion batteries. Korean J. Chem. Eng. 33, 514-526 (2016).

Wu, G. & Zhou, Y. TiP2O7-coated LiNi0.8Co0.15Al0.05O2 cathode materials with improved thermal stability and superior cycle life. J. Energy Chem. 28, 151-159 (2019).

Mo, R. et al., Facile synthesis of nanocrystalline LiFePO4/graphene composite as cathode material for high power lithium ion batteries, Electrochimica Acta, 130, 594-599, (2014).

Li, N et al., The preparation and graphene surface coating NaTi2(PO4)3 as cathode material for lithium ion batteries, Applied Surface Science, 399, 624-629, (2017).

Chen, K. et al., Comprehensive Enhancement of Nanostructured Lithium-Ion Battery Cathode Materials via Conformal Graphene Dispersion, Nano Letters, 17, 4, 2539-2546, (2017).

EPO, "Supplementary European Search Report for EP Application No. 21800210.3 ", Munich, Germany, Dec. 5, 2024.

Large et al., "Functional liquid structures by emulsification of graphene and other two-dimensional nanomaterials", 2018.

JPO, "First Office Action for JP Application No. 2022-567153", Japan, Feb. 5, 2024.

Korean Intellectual Property Office (ISR/KR), "International Search Report for PCT/US2021/028556", Korea, Aug. 11, 2021.

Park, K-Y, et al. "Concurrently approaching volumetric and specific capacity limits of lithium battery cathodes via conformal pickering emulsion graphene coatings." Advanced Energy Materials, (May 18, 2020), vol. 10, issue 25.

KIPO, "Office Action for KR Application No. 10-2022-7042071", Korea, Jul. 17, 2025.

* cited by examiner

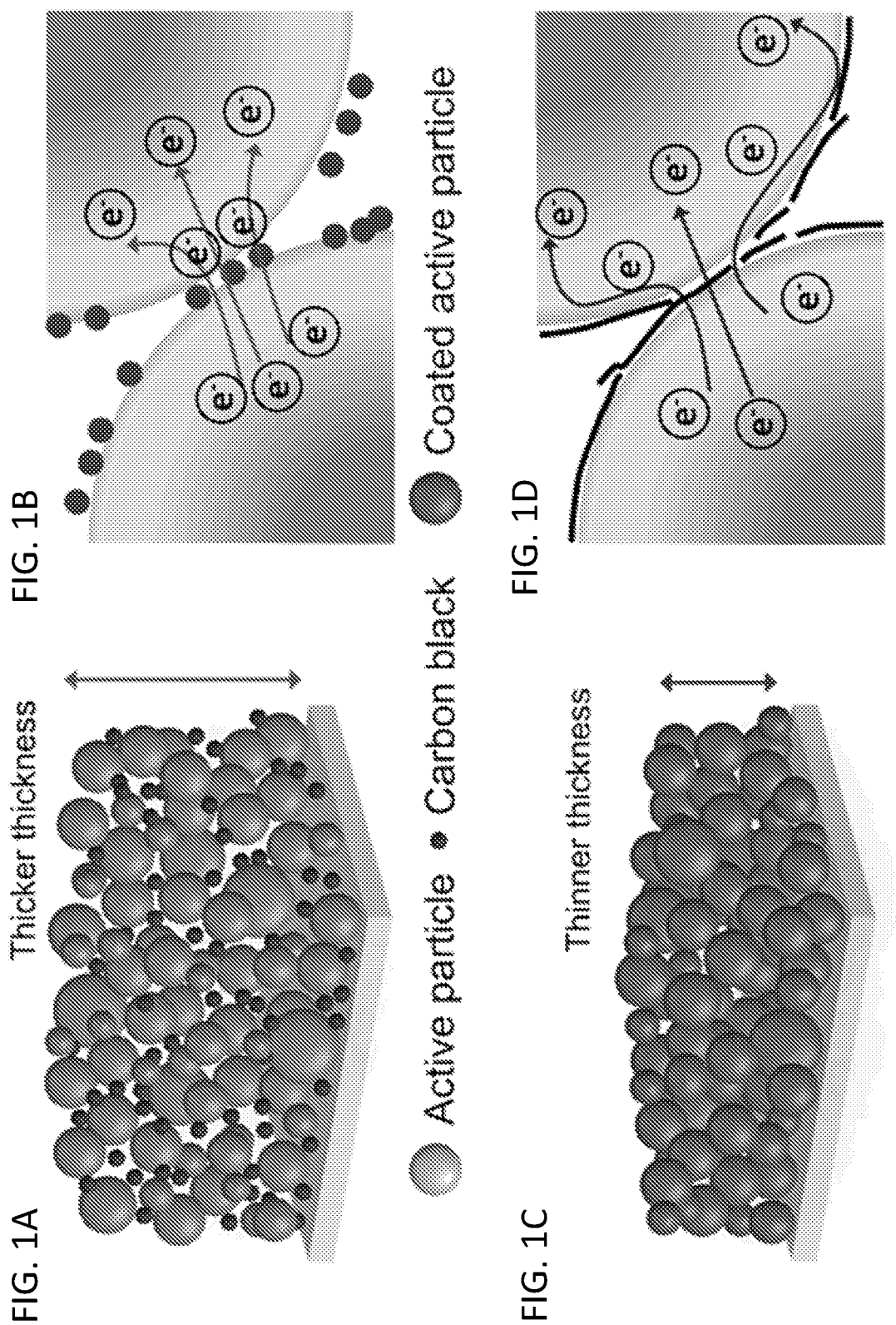

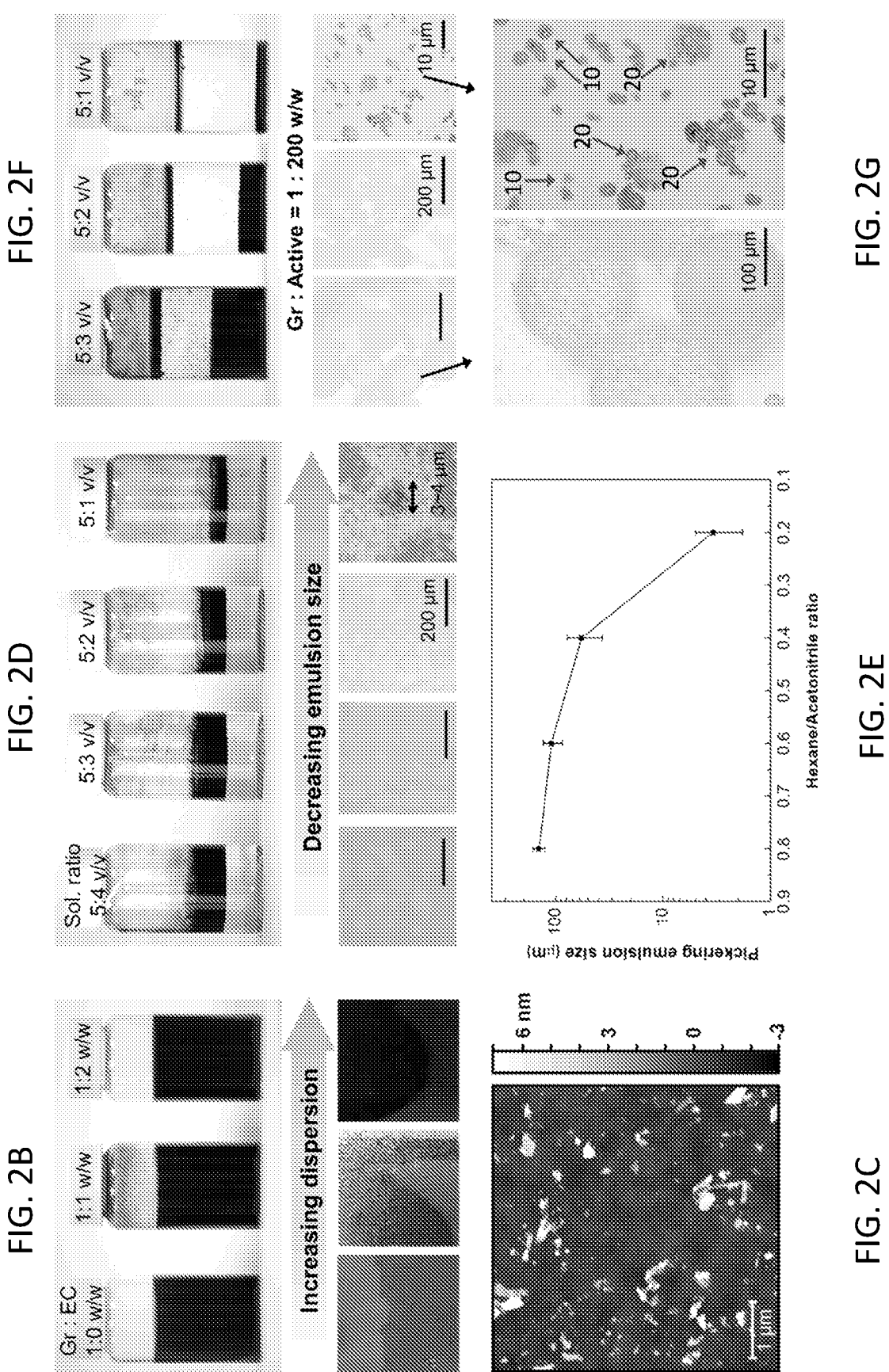

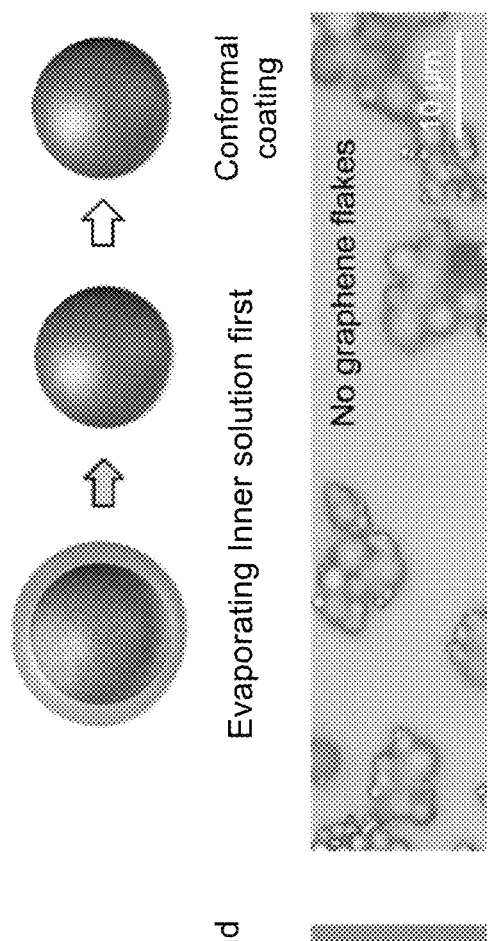
Normal drying process
Fractional distillation
Collapsed emulsion
Uneven coating and graphene flakes
Evaporating Inner solution first
Conformal coating
FIG. 3A
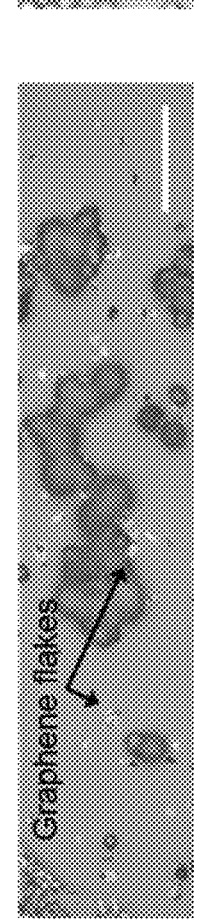
Graphene flakes
No graphene flakes
FIG. 3B
FIG. 3C FIG. 3D
FIG. 3E
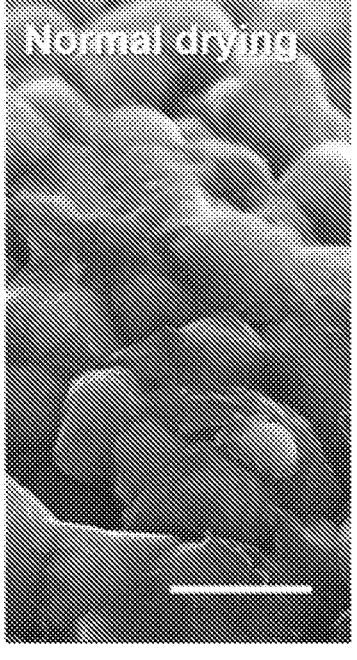
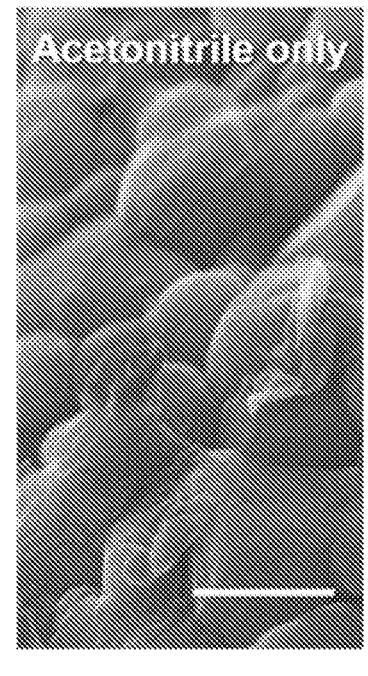
FIG. 3F
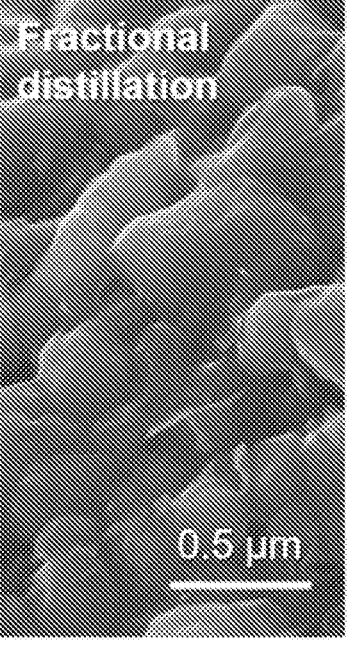
FIG. 3G
FIG. 3H

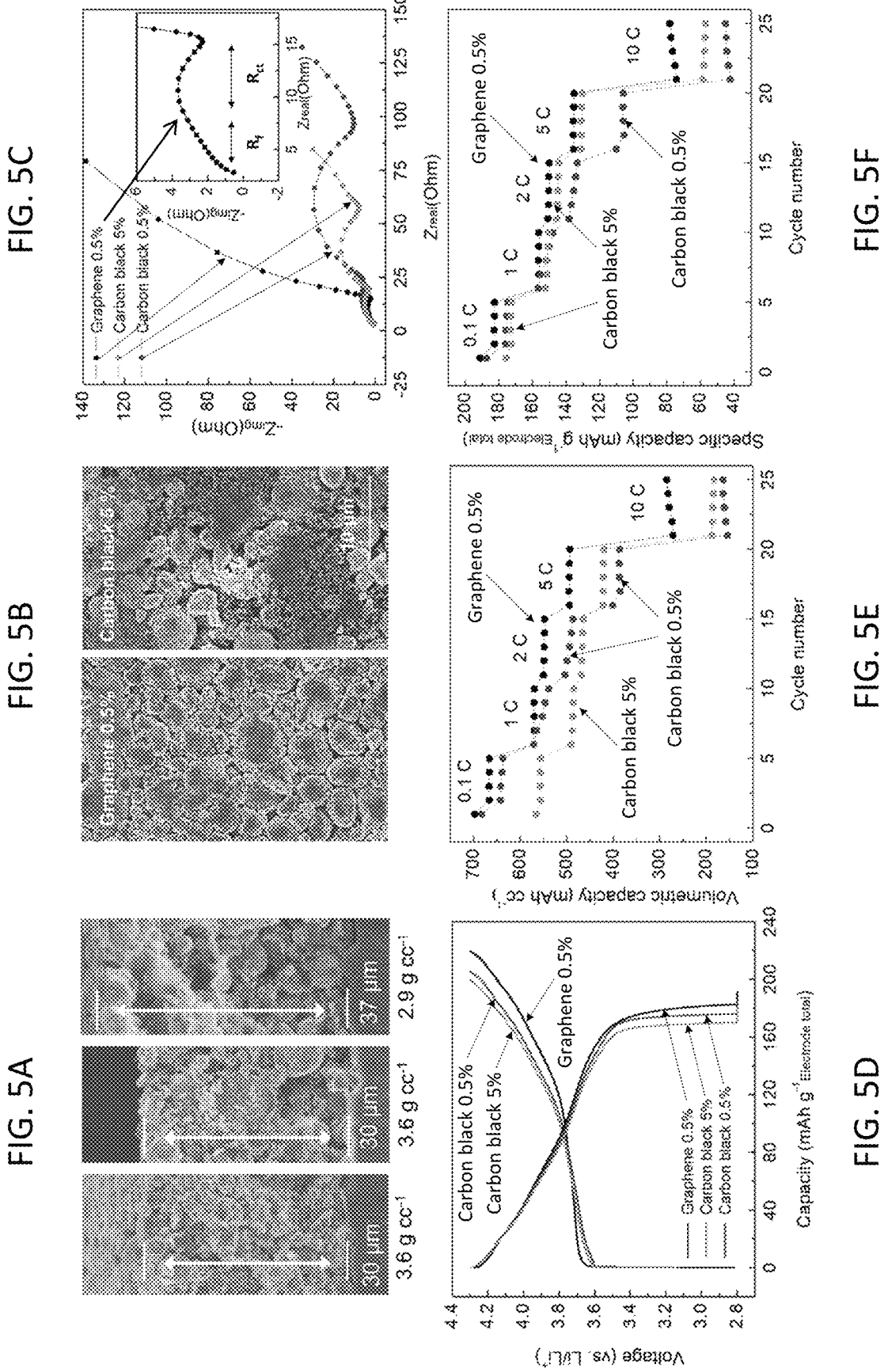

| Sample | Concentration of graphene (mg cc$^{-1}$, acetonitrile) | Notes |
|---|---|---|
| a | 0.25 | No droplet |
| b | 0.5 | No droplet |
| c | 0.75 | - |
| d | 1 | - |
| e | 1.5 | - |
| f | 2 | - |
| g | 3 | - |

FIG. 12

FIG. 14A
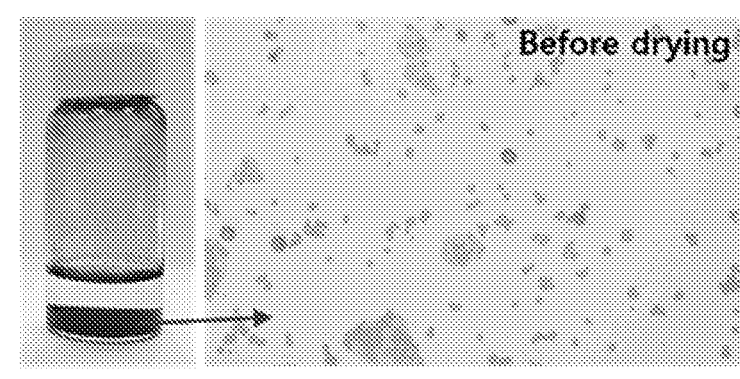
FIG. 14B
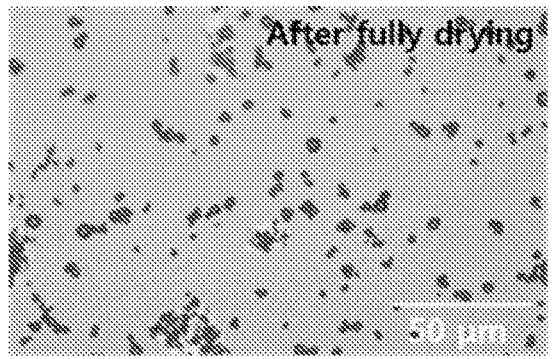
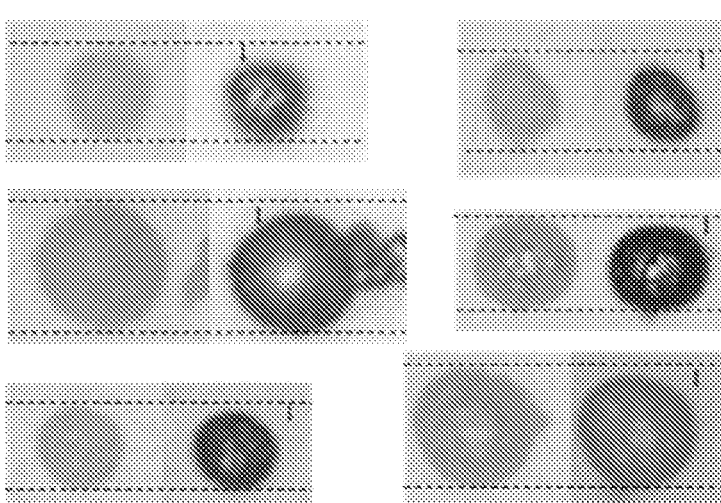
FIG. 14C
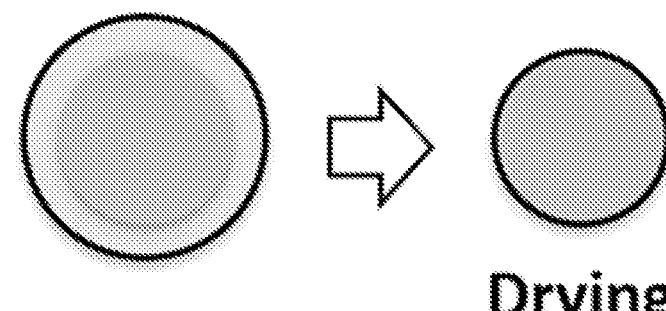

Stirring for 10 minutes     After 10 minutes     Stirring for 10 minutes     After 10 minutes

CONFORMAL PICKERING EMULSION GRAPHENE COATINGS FOR ELECTRODE MATERIALS AND FORMING METHODS APPLICATIONS OF SAME

CROSS-REFERENCE TO RELATED PATENT APPLICATION

This application claims priority to and the benefit of U.S. Provisional Application No. 63/019,552, filed May 4, 2020, which is incorporated herein in its entirety by reference.

STATEMENT AS TO RIGHTS UNDER FEDERALLY-SPONSORED RESEARCH

This invention was made with government support under CMMI-1727846 and DMR-1720139 awarded by the National Science Foundation, and DEAC02-06CH1157 awarded by the Department of Energy. The government has certain rights in the invention.

FIELD OF THE INVENTION

The present invention relates generally to materials, and more particularly to conformal Pickering emulsion graphene coatings for electrode materials, forming methods and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

As confirmed by the 2019 Nobel Prize in Chemistry, lithium-ion batteries (LIBs) have become ubiquitous with a profound impact on diverse technologies including portable electronics, electric vehicles, home energy storage systems, and grid-level energy leveling solutions. The key characteristics of rechargeable LIBs are high energy and power densities that result from their reversible and efficient electrochemistry. However, growing demand for extending the range of electric vehicles and the battery life of portable devices has driven efforts to develop next-generation LIBs with higher capacities. Since the capacity of a LIB is primarily determined by its electrochemically active electrode materials, a considerable number of studies have attempted to identify alternative materials with higher reversible lithiation capacity. In particular, high-capacity cathode materials have been intensively investigated since cathode materials generally exhibit significantly lower capacities than anode materials, leaving more room for improvement. The capacity of active electrode materials is quantified with two figures of merit: capacity per unit mass (i.e., specific or gravimetric capacity with typical units of mAh $g^{-1}$) and capacity per unit volume (i.e., volumetric capacity with typical units of mAh $cc^{-1}$). High specific capacities have traditionally been the target of electronic devices to enable improved portability, whereas high volumetric capacity is equally important in large-scale applications, such as electric vehicles and home energy storage systems, due to the limited space where large LIB packs can be mounted.

Practical specific and volumetric capacities of Li-ion batteries highly rely on not only the intrinsic properties of the active materials but also the content of other inactive components in the electrode. Accordingly, Li-ion batteries show practical capacities that are 5-20% below theoretical limits due to inactive components. To achieve the high energy densities demanded by emerging technologies, lithium-ion battery electrodes need to approach the volumetric and specific capacity limits of their electrochemically active constituents, which requires minimization of the inactive components of the electrode. However, a reduction in the percentage of inactive conductive additives limits charge transport within the battery electrode, which results in compromised electrochemical performance.

Therefore, a heretofore unaddressed need exists in the art to address the aforementioned deficiencies and inadequacies.

SUMMARY OF THE INVENTION

One of the objectives of this invention is to provide composite materials and electrodes of the composite materials that achieve efficient electron and lithium-ion transport kinetics at exceptionally low conductive additive levels and industrially relevant active material areal loadings.

In one aspect, the invention relates to a method for fabricating a composite material. The method includes forming an emulsion mixture of active material particles and graphene emulsion droplets containing immiscible first and second solvents and a solid-state emulsifier of graphene, wherein the first and second solvents are adapted such that the second solvent resides in an interior of the graphene emulsion droplets with the first solvent as an exterior solvent, and the active material particles reside in the interior of the emulsion droplets; wherein a boiling point of the second solvent is lower than that of the first solvent; and drying the emulsion mixture with subsequent evaporation of the second solvent and the first solvent through fractional distillation to form the composite material having each surface of the active material particles conformally coated with said graphene.

In one embodiment, said forming the emulsion mixture comprises dispersing said graphene into the first solvent to form a base solution; and mixing the second solvent with the base solution to form the graphene emulsion droplets by sonication; and inserting the active material particles into the graphene emulsion droplets by agitation.

In another embodiment, said forming the emulsion mixture comprises dispersing said graphene into the first solvent to form a base solution; dispersing the active material particles into the base solution to form a first mixture; adding the second solvent in the first mixture to form a second mixture and sonicating the second mixture so as to insert the active material particles into the graphene emulsion droplets.

In one embodiment, the graphene emulsion droplets further contains ethyl cellulose (EC) as an additive for increasing dispersity and emulsifier characteristics of said graphene.

In one embodiment, a weight ratio of said graphene to said EC is in a range from about 1:0 to about 1:3, preferably, about 1:2.

In one embodiment, the method further comprises thermal annealing the composite material at a temperature in an oxidizing environment to decompose the majority of EC, with the remaining amorphous carbon residue possessing a high sp$^2$-carbon content that facilitates electron transport between graphene flakes. In one embodiment, the temperature is in a range of about 150-350° C., preferably, about 250° C.

In one embodiment, an average size of the graphene emulsion droplets changes with changing the volume ratio of the first solvent to the second solvent, and a concentration of said graphene in the base solution.

In one embodiment, a volume ratio of the first solvent to the second solvent is in a range from about 5:4 to about 5:1.

In one embodiment, the average size of the graphene emulsion droplets is reduced with decreasing content of the second solvent, and is less than about 5 μm at the 5:1 volume ratio of the first solvent to the second solvent.

In one embodiment, the first solvent comprises acetonitrile, heptane, water, or acetic acid and the second solvent comprises pentane, cyclohexane, acetonitrile, benzene, hexane, or chloroform.

In one embodiment, the first solvent comprises acetonitrile having the boiling point of 82° C., and the second solvent comprises hexane having the boiling point of 68° C. In one embodiment, the fractional distillation is performed with a rotary evaporator having a bath temperature set to about 50° C., and a pressure set at about 0.6 atm for a first period of time pressure to completely and selectively remove the hexane, resulting in a controlled collapse of the emulsion droplets and a conformal graphene coating on the active material particles, and the pressure subsequently lowered to under 0.2 atm for a second period of time to fully remove the acetonitrile, leading to conformally graphene-coated active material particles.

In one embodiment, the weight ratio of said graphene to the active material particles is in a range from about 1:400 to about 1:100, preferably, about 1:200.

In one embodiment, said graphene comprises solution-exfoliated graphene.

In one embodiment, the active material comprises lithium cobalt oxide, lithium iron phosphate, lithium manganese oxide, lithium nickel manganese cobalt oxide, lithium nickel cobalt aluminum oxide, or a combination thereof.

In one embodiment, the active material comprises nickel-rich lithium oxides.

In one embodiment, the active material comprises LiNi$_{0.8}$Co$_{0.15}$Al$_{0.05}$O$_2$ (NCA), LiNiO$_2$ (LNO), LiMn$_{1.5}$Ni$_{0.5}$O$_4$ (LMNO), LiNi$_x$Mn$_y$Co$_z$O$_2$ (NMC, where x+y+z=1), LiNi$_{0.8}$Co$_{0.2}$O$_2$ (LNCO), or Li$_w$Ni$_x$Mn$_y$Co$_z$O$_2$ (lithium-rich NMC, where w>1, x+y+z=1).

In one embodiment, the active material is doped with elements including Al, B, Zr, Nb, Fe, Cr, Cu, Mo, W, and/or V.

In another aspect, the invention relates to a composite material comprising graphene; and active material particles, wherein each surface of the active material particles is conformally coated with said graphene.

In one embodiment, said each surface of the active material particles is conformally coated with said graphene by a Picking emulsion process.

In one embodiment, the composite material further comprises amorphous carbon with sp$^2$-carbon content that facilitates electron transport between graphene flakes. In one embodiment, the amorphous carbon is an annealation product of ethyl cellulose.

In one embodiment, the weight ratio of said graphene to the active material particles is in a range from about 1:400 to about 1:100, preferably, about 1:200.

In one embodiment, said graphene comprises solution-exfoliated graphene.

In one embodiment, the active material comprises lithium cobalt oxide, lithium iron phosphate, lithium manganese oxide, lithium nickel manganese cobalt oxide, lithium nickel cobalt aluminum oxide, or a combination thereof.

In one embodiment, the active material comprises nickel-rich lithium oxides.

In one embodiment, the active material comprises NCA, LNO, LMNO, NMC, LNCO, or lithium-rich NMC.

In one embodiment, the active material is doped with elements including Al, B, Zr, Nb, Fe, Cr, Cu, Mo, W, and/or V.

In yet another aspect, the invention relates to an electrode for an electrochemical device comprising a composite material comprising graphene, and active material particles, wherein each surface of the active material particles is conformally coated with said graphene.

In one embodiment, the composite material further comprises amorphous carbon with sp$^2$-carbon content that facilitates electron transport between graphene flakes. In one embodiment, the amorphous carbon is an annealation product of ethyl cellulose.

In one embodiment, said each surface of the active material particles is conformally coated with said graphene by a Picking emulsion process.

In one embodiment, the weight ratio of said graphene to the active material particles is in a range from about 1:400 to about 1:100, preferably, about 1:200.

In one embodiment, said graphene comprises solution-exfoliated graphene.

In one embodiment, the active material comprises lithium cobalt oxide, lithium iron phosphate, lithium manganese oxide, lithium nickel manganese cobalt oxide, lithium nickel cobalt aluminum oxide, or a combination thereof.

In one embodiment, the active material comprises nickel-rich lithium oxides.

In one embodiment, the active material comprises NCA, LNO, LMNO, NMC, LNCO, or lithium-rich NMC.

In one embodiment, the active material is doped with elements including Al, B, Zr, Nb, Fe, Cr, Cu, Mo, W, and/or V.

In one embodiment, the electrode with only 0.5 wt % graphene achieves an active material areal loading of greater than about 10 mg cm$^{-2}$, and at least about 98% volumetric and specific capacities of the theoretically limits of the active material.

In one embodiment, the electrode with only 0.5 wt % graphene retains about 91.5% of its initial volumetric capacity over 100 cycles, and maintains about 99.7% Coulombic efficiency.

In one embodiment, the electrode with only 0.5 wt % graphene retains about 70% of its initial volumetric capacity over 250 cycles.

One aspect of the invention also relates to an electrochemical device comprising the electrode as disclosed above.

In one embodiment, the electrochemical device is a battery.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIGS. 1A-1D show comparison of point-contact and conformal planar-contact charge transport networks in lithium-ion battery electrodes. FIG. 1A: Schematic of a conventional electrode consisting of active materials and carbon black conductive agent. FIG. 1B: An inherently limited, point-contact electron transport pathway arising from particle-based carbon additives. FIG. 1C: Electrodes including thin graphene-coated active particles with a high packing density according to embodiments of the invention. FIG. 1D: Conformal planar contacts minimize current bottlenecks and facilitate percolating pathways throughout the electrode according to embodiments of the invention.

FIGS. 2A-2G show graphene Pickering emulsions based on acetonitrile and hexane according to embodiments of the invention. FIG. 2A: Schematic of the Gr/EC Pickering emulsion in acetonitrile and hexane followed by insertion of the active material particle. FIG. 2B: Dispersion behavior of graphene in acetonitrile depending on Gr:EC (w/w) ratio. Inset figures show magnified images of the dispersion quality. FIG. 2C: Atomic force microscopy image of pristine graphene flakes obtained by liquid phase exfoliation. FIG. 2D: Hexane droplets formed in Gr/EC/acetonitrile solution, where the volume ratio of acetonitrile to hexane is (from left to right) 5:4, 5:3, 5:2, and 5:1. The graphene concentration in acetonitrile is fixed as 0.275 mg $cc^{-1}$. FIG. 2E: Size change of emulsion droplets with changing hexane to acetonitrile volume ratio. FIG. 2F: Encapsulation of NCA active particles by emulsion droplets, where the volume ratio of acetonitrile to hexane is (from left to right) 5:3, 5:2, and 5:1 with a graphene concentration in acetonitrile of 0.275 mg $cc^{-1}$. The weight ratio of graphene to NCA is 1:200. FIG. 2G: Magnified optical microscopy images of encapsulated NCA particles acetonitrile to hexane ratios of (left) 5:3 and (right) 5:1.

FIGS. 3A-3H show high graphene coating uniformity by fractional distillation according to embodiments of the invention. FIG. 3A: Schematic comparison of the coating uniformity depending on the drying process: (left) normal drying process and (right) fractional distillation drying process by evaporating hexane and acetonitrile sequentially. FIGS. 3B-3C: Optical microscopy images of dried powders by (FIG. 3B) normal process and (FIG. 3C) using fractional distillation. FIG. 3D: Chamber pressure as a function of time during fractional distillation. The heated bath is set at 50° C. FIGS. 3E-3H: Scanning electron microscopy images showing NCA particles prepared by the following methods: FIG. 3E: bare active material surface; FIG. 3F: single solvent process using Gr/EC dispersed in acetonitrile with normal drying on a hot plate at 50° C.; FIG. 3G: Pickering emulsion process with normal drying on a hot plate at 50° C.; FIG. 3H: Pickering emulsion process with drying by fractional distillation.

FIG. 4A: Scaled-up Pickering emulsion process for conformally coating 10 g of NCA powder with graphene. FIG. 4B: Raman spectra of the coated powder before removing ethyl cellulose, after removing ethyl cellulose through thermal annealing at about 250° C. in an oxidizing environment, and bare NCA. FIG. 4C: Transmission electron microscopy image of a graphene-encapsulated NCA particle, revealing conformal graphene flakes/coating on the surface of the NCA particle. FIG. 4D: Scanning electron microscopy (SEM) image of a graphene-encapsulated particle and FIG. 4E: a magnified SEM image showing the coating morphology. FIG. 4F: Energy-dispersive spectroscopy results for O, Co, Ni, Al, and C elements on a graphene-coated NCA particle following ethyl cellulose removal.

FIG. 5A-5G show electrochemical testing of NCA electrodes according to embodiments of the invention. FIG. 5A: Compressed thickness of electrodes consisting of (left) 0.5 wt % graphene, (middle) 0.5 wt % carbon black, and (right) 5 wt % carbon black electrodes. FIG. 5B: Top-view scanning electron microscopy images of 0.5 wt % graphene and 5 wt % carbon black electrodes. FIG. 5C: Nyquist plots of prepared electrodes. FIG. 5D: Galvanostatic profiles of prepared electrodes with respect to the total electrode specific capacity with a current density of C/10. A constant voltage was applied at 2.8 V after discharge until the current density reached C/50. FIG. 5E: Rate capability results with respect to volumetric capacity. The electrodes were charged to 4.3 V at a 1 C rate and discharged to 2.8 V at rates of 1 C, 2 C, 5 C, and 10 C (except for the C/10 test). FIG. 5F: Rate capability results with respect to the total electrode specific capacity. FIG. 5G: Cycle life test results at a rate of 1 C.

FIGS. 6A-6C show comparison of volumetric and specific capacities with theoretical limits and literature precedent. FIG. 6A: The volumetric and specific capacity of this work is compared to theoretical limits (star-shaped points) and literature precedent (round points) for various cathode materials. FIGS. 5B-5C: Comparison of rate performance results with literature precedent for (FIG. 5B) volumetric and (FIG. 5C) specific capacity. The references are defined as follows: Ref [1] used Mn content control, Ref [2] used Al gradient doping, Ref. [3] used particle growth control, Ref. [4] used pre-oxidized precursor, Ref. [5] used vanadium treatment, Ref. [6] used $NaAlO_2$ treatment, and Ref [7] used morphology control. For the references that do not provide compressed/packing densities, we estimated the density based on the amount of conductive carbon additive and binder used.

Although there were no major changes in the X-ray diffraction patterns for any of these solvents, impurities were observed on the surface of the NCA particles stored in ethanol, water, and acetone. No surface changes were observed for the NCA particles stored in IPA, acetonitrile, and hexane.

Figure 9B:
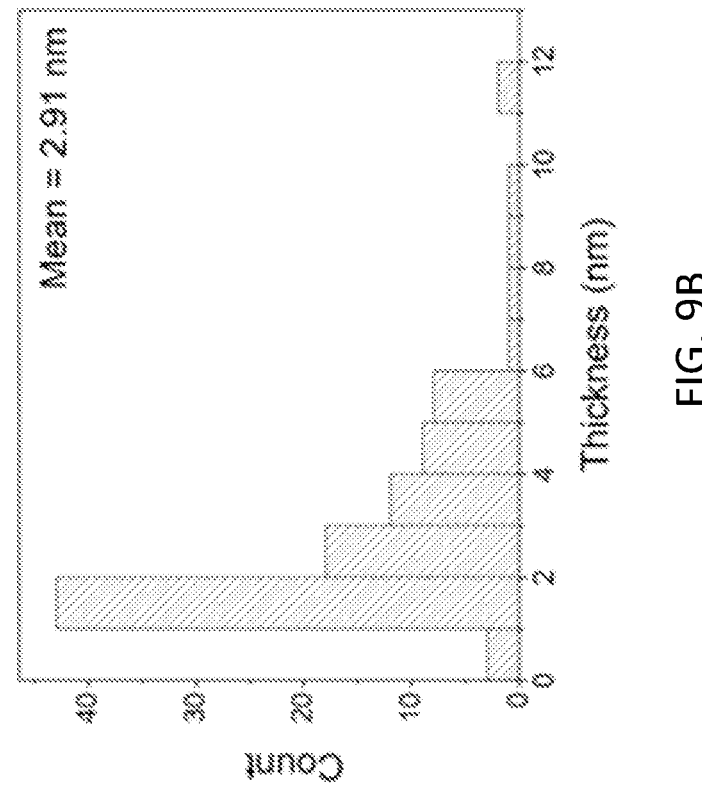
Figure 9A:
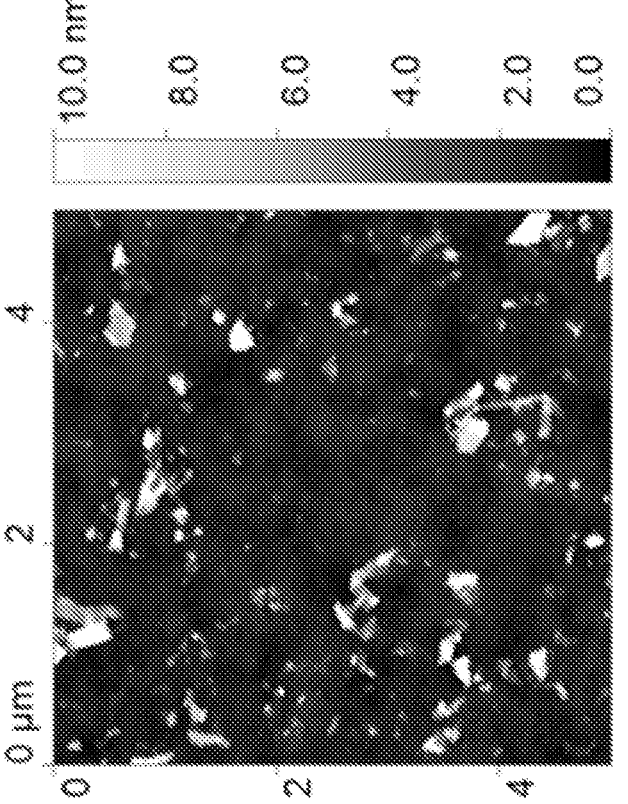

FIGS. 9A-9B show graphene flakes were liquid phase exfoliated from bulk graphite using an inline shear mixer according to embodiments of the invention. The mean thickness of the flakes is 2.91 nm, and the mean lateral size is 156 nm. FIG. 9A: Atomic force microscopy image of drop-cast graphene flakes. FIG. 9B: Histogram of graphene flake thickness.

Figure 10:
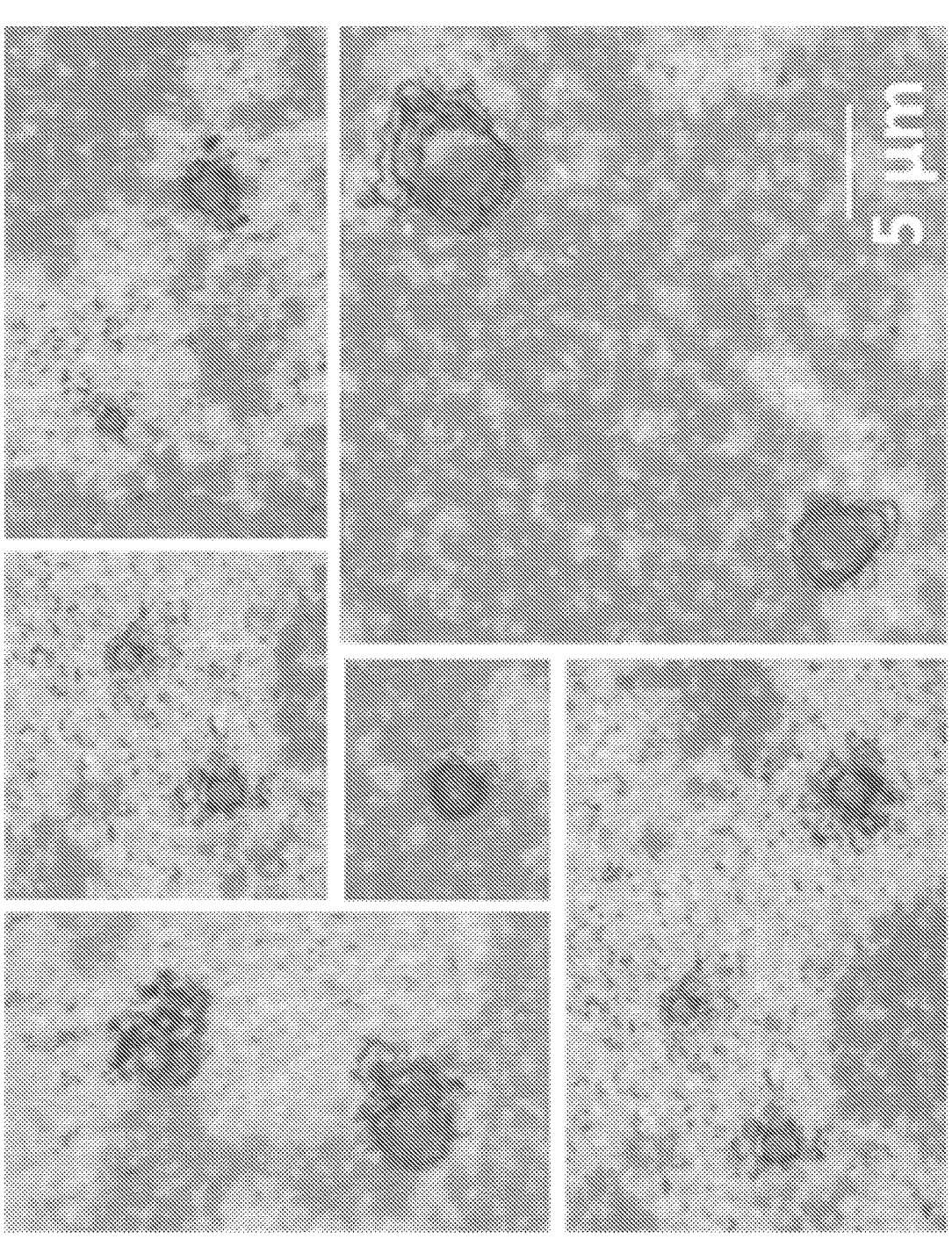

FIG. 10 shows high-resolution optical microscopy images showing the size of the emulsion droplets at a 5:1 ratio of acetonitrile to hexane according to embodiments of the invention.

Figure 11:
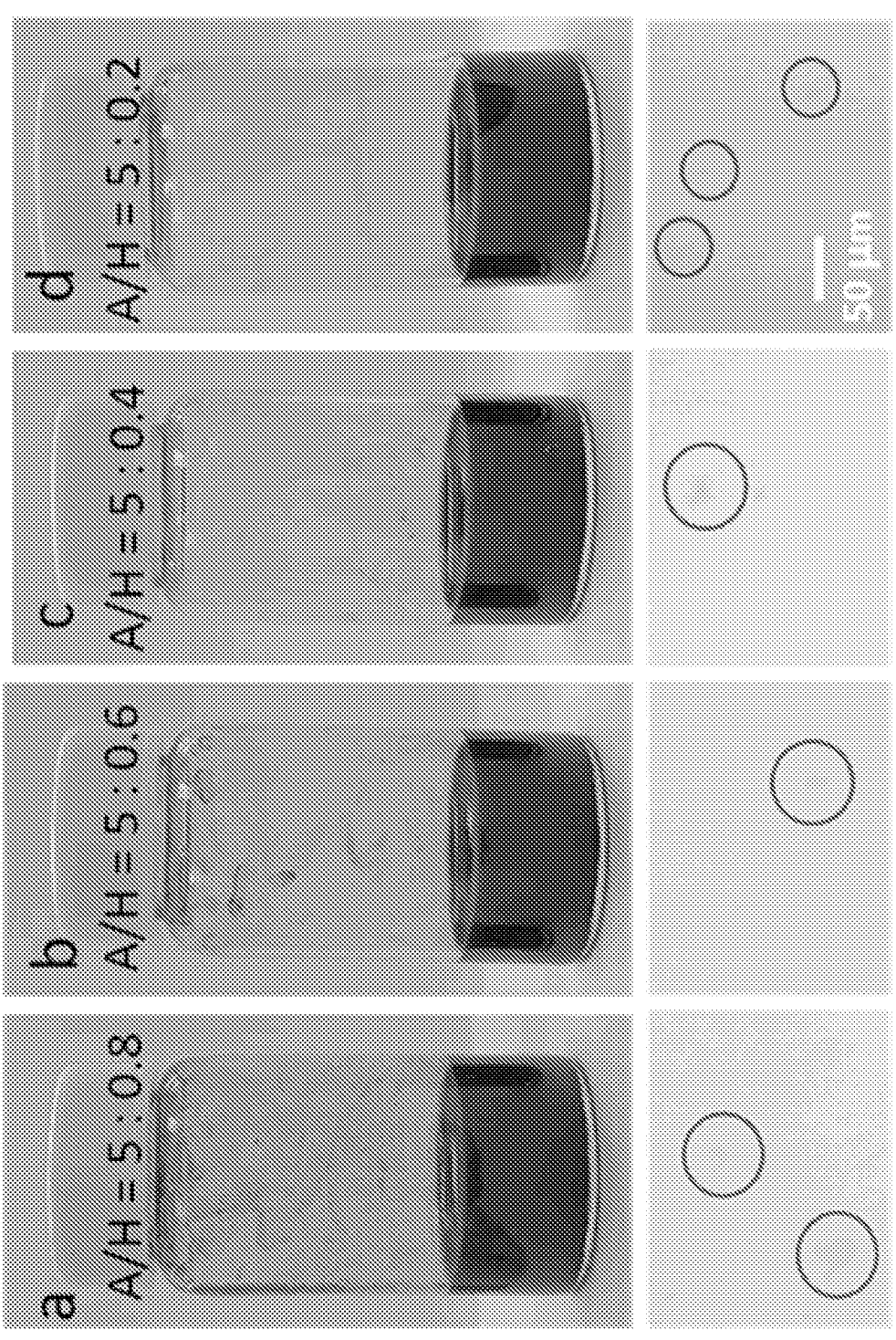

FIG. 11 shows optical microscopy images for acetonitrile to hexane (A/H) ratios of 5:0.8, 5:0.6, 5:0.4, and 5:0.2 (left to right) according to embodiments of the invention. No significant changes were observed in the size of the emulsion droplets at acetonitrile to hexane ratios above 5:1. Instead, the emulsion droplets tended to cluster at these low hexane levels (red circles). Consequently, we concluded that the limit of forming well-behaved emulsions is an acetonitrile to hexane ratio of 5:1.

FIG. 12 shows changes in the size of emulsion droplets as a function of the concentration of graphene according to embodiments of the invention. Droplets were not formed in samples a-b. From optical microscopy images, it was observed that higher concentrations of graphene resulted in smaller emulsion droplet sizes (samples c-h). Throughout this figure, the weight ratio of graphene to EC was held constant at 1:2, and the volume ratio of acetonitrile to hexane was held constant at 1:1.

Figure 13A:
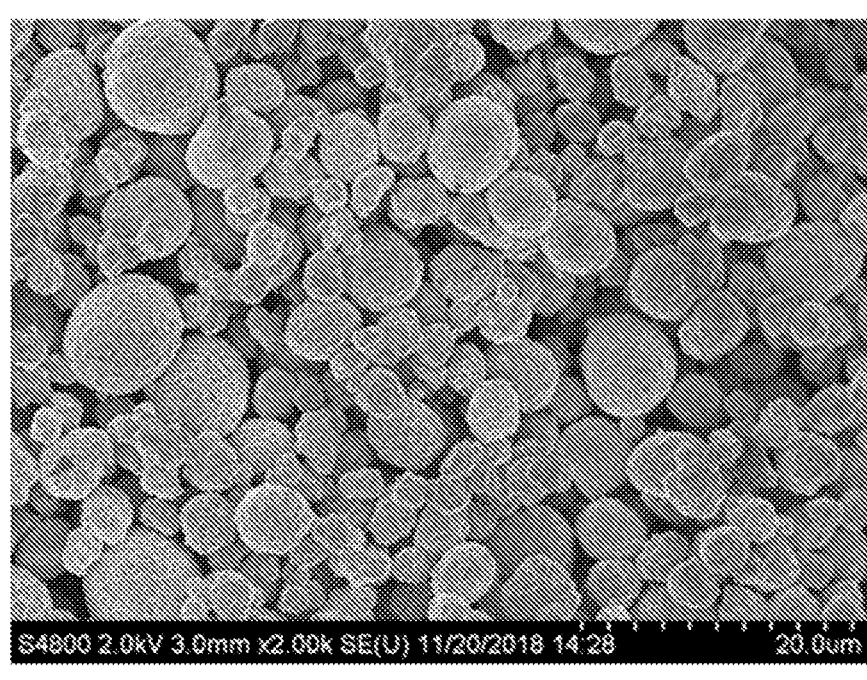
Figure 13B:
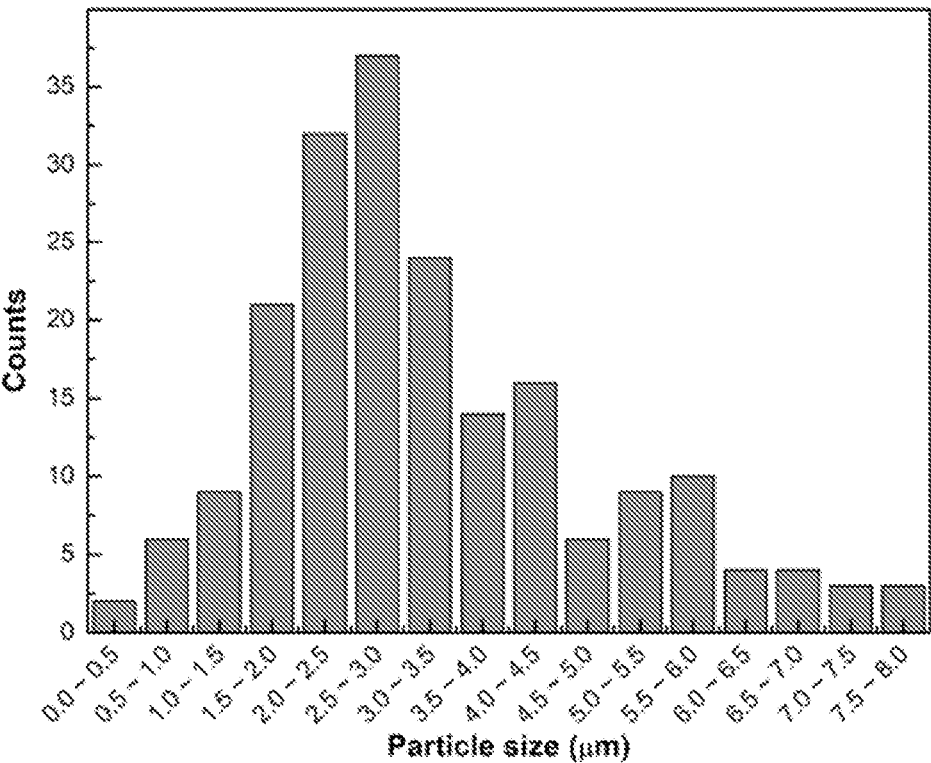

FIGS. 13A-13B show respectively SEM image of NCA particles and size distribution of NCA particles obtained by measuring 200 random particles according to embodiments of the invention.

FIGS. 14A-14C show verification that individual particles are inserted into the emulsion droplets according to embodiments of the invention. FIG. 14A: NCA particles were mixed with graphene at a ratio of 200:1 with the volume ratio of A/H set at 5:1. Then, the individual particles in the solution were tracked with an optical microscope during drying. FIG. 14B: Images comparing individual particles before (left) and after drying (right). FIG. 14C: Schematic of the drying process. As the hexane droplet collapses, the graphene on the droplet surface conformally coats the interior NCA particle.

Figure 15:
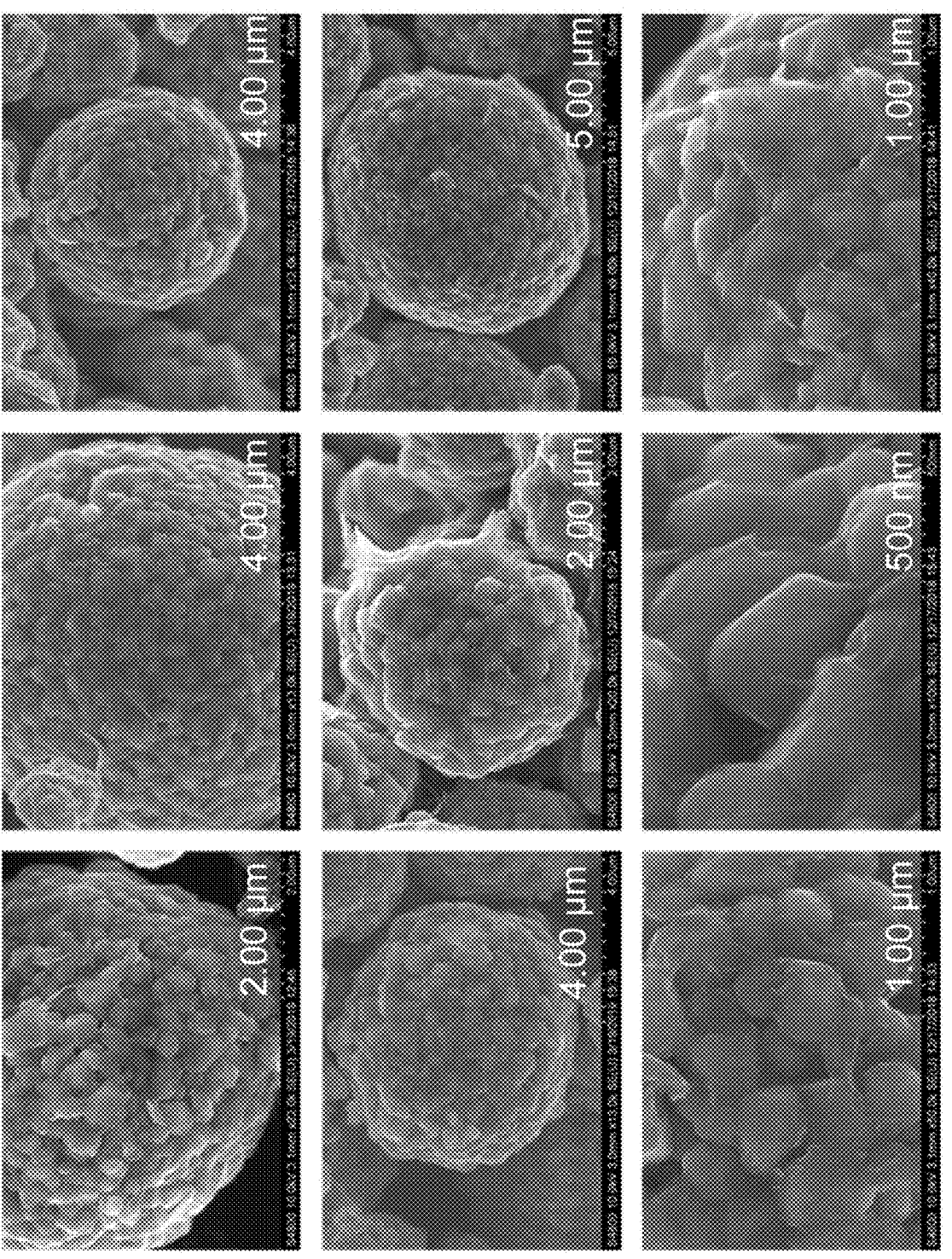

FIG. 15 shows NCA particles coated with 0.5 wt % graphene observed with scanning electron microscopy (SEM) at varying magnification according to embodiments of the invention. These particles were coated with a volume ratio of 5:1 A/H and dried using fractional distillation. All observed particles were homogenously coated with graphene.

Figure 16:
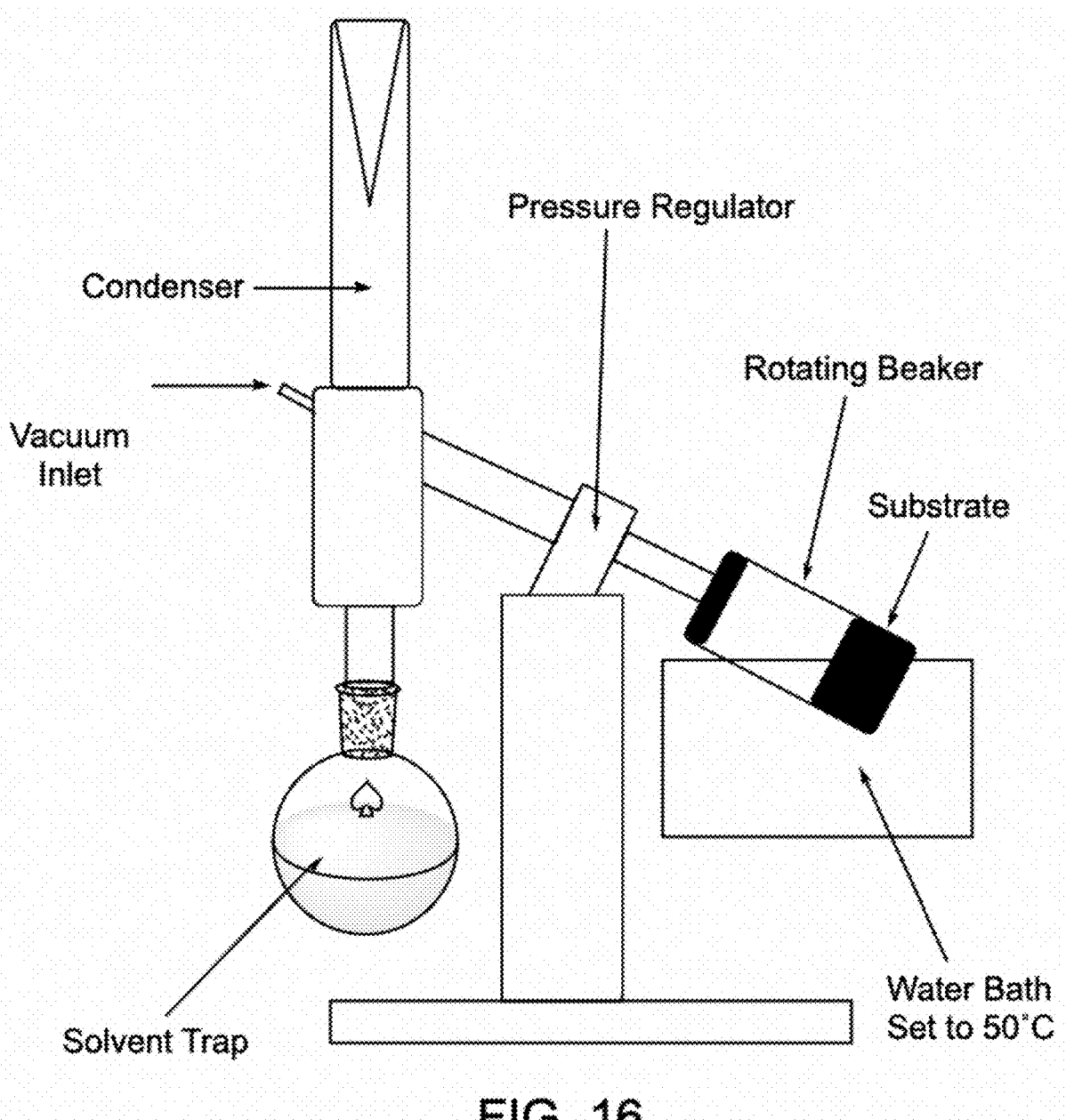

FIG. 16 shows a rotary evaporator used in the experiment according to embodiments of the invention. The bath temperature was set to 50° C., and the speed of the rotating beaker was set to 100 rpm.

Figure 17:
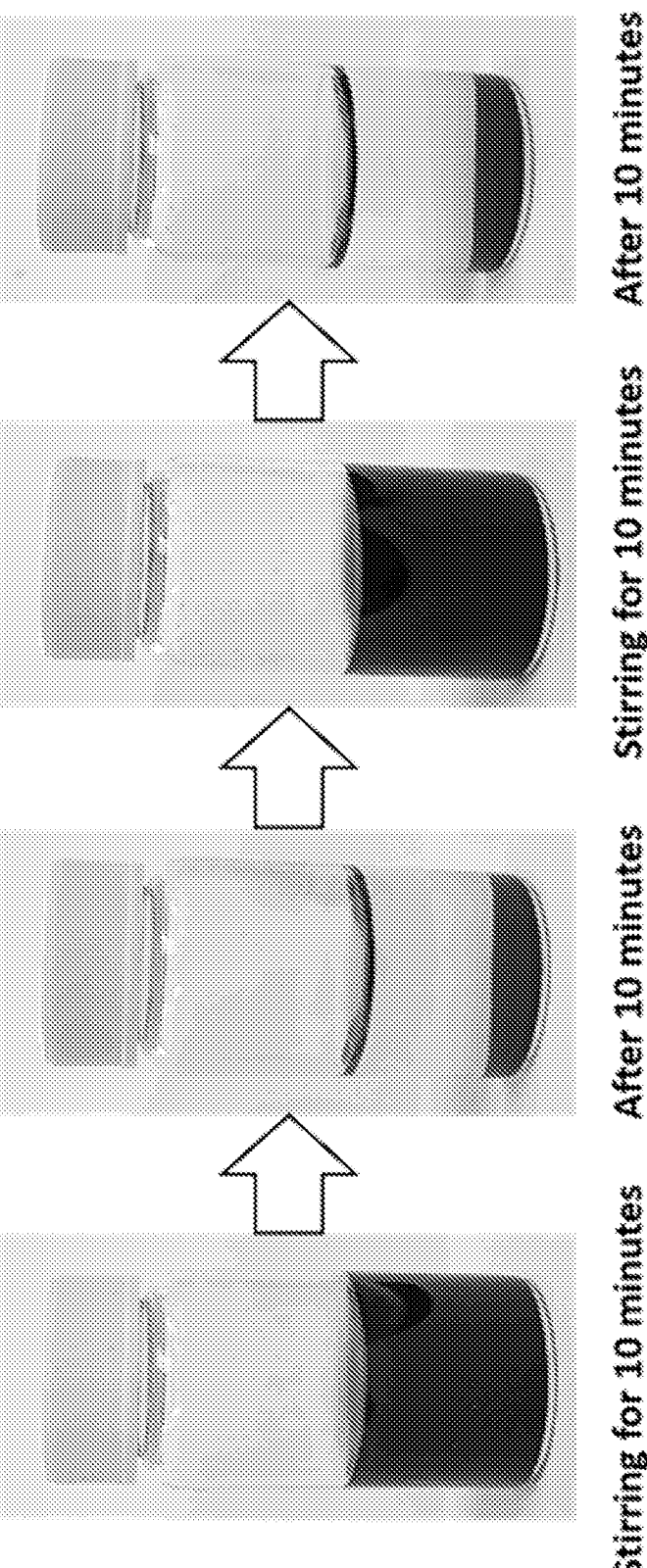

FIG. 17 shows a dispersion behavior after only hexane was removed (i.e., the graphene-encapsulated NCA powders are now dispersed only in acetonitrile) according to embodiments of the invention. After repeatedly stirring the mixture for 10 minutes and then letting it sit for 10 minutes, the graphene flakes remain adhered to the surface of the NCA powders.

Figure 18:
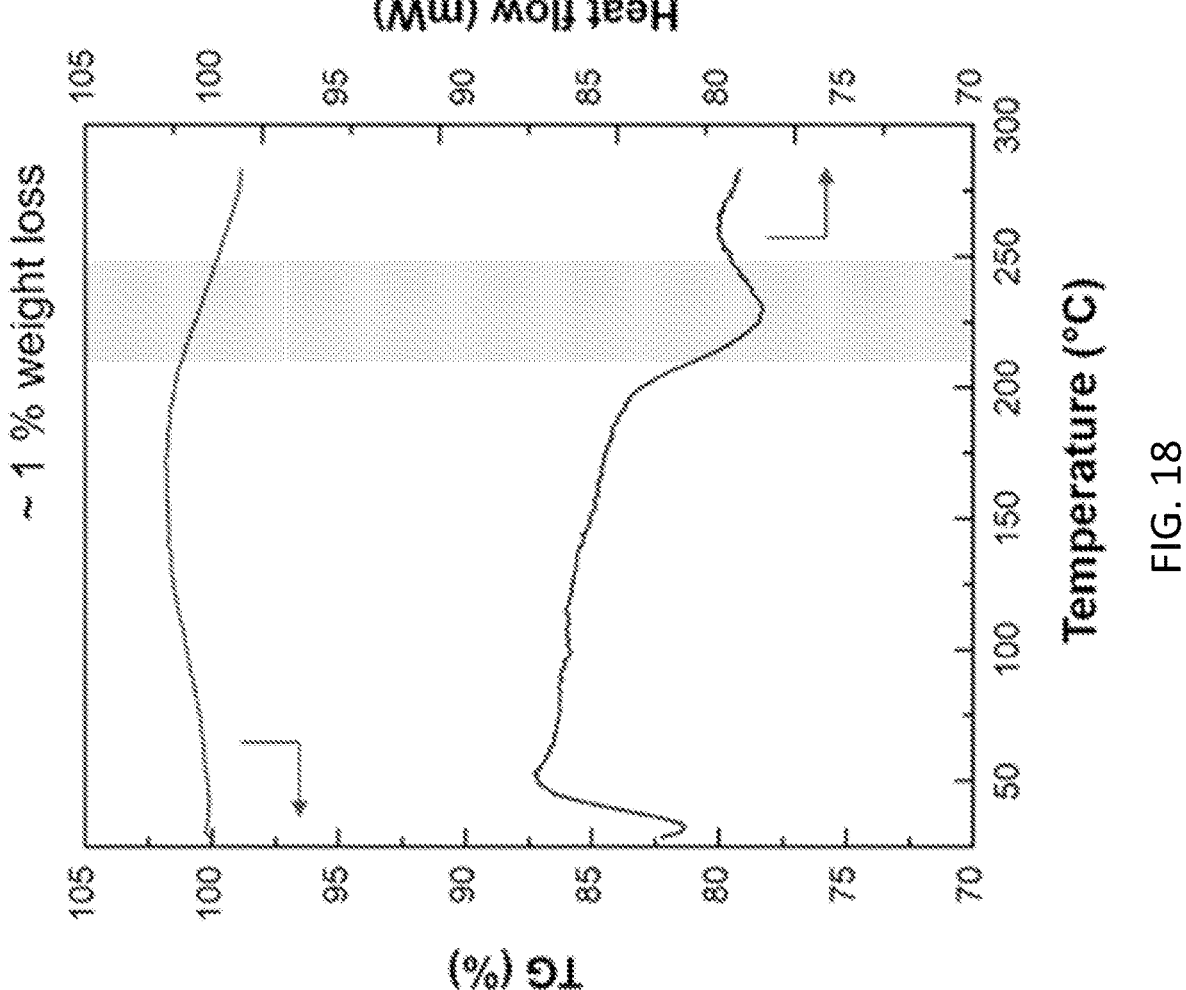

FIG. 18 shows thermogravimetry (TG) and differential thermal analysis (DTA) in an $O_2$ atmosphere at a temperature ramp speed of 5° C./min. DTA shows that the mixture of EC, graphene, and NCA particles undergo a heat absorption reaction near 250° C. TG also shows a weight change of about 1%, which is consistent with the original amount of EC.

Figure 19:
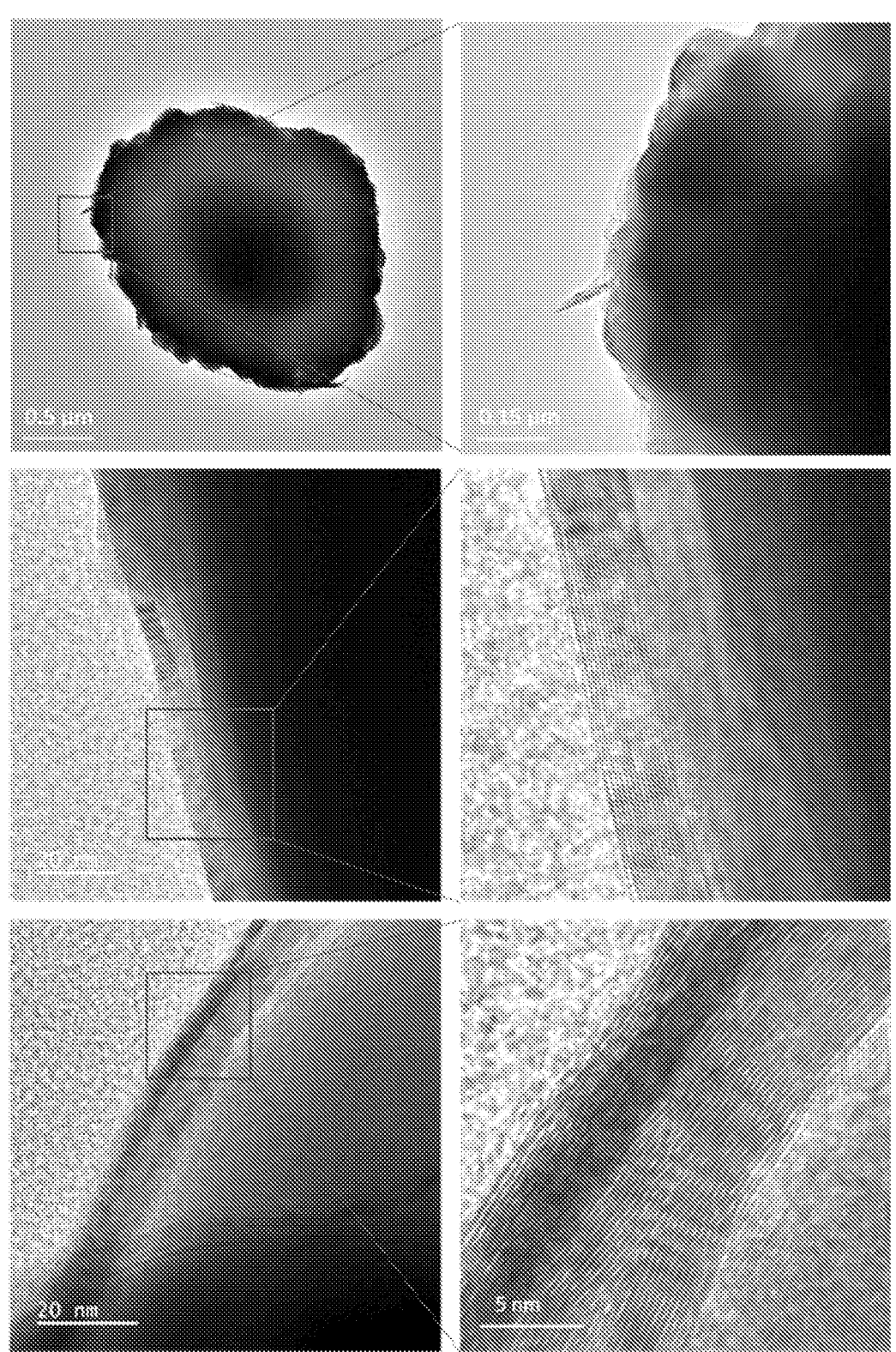

FIG. 19 shows transmission electron microscopy (TEM) images of NCA particles coated with graphene following thermal decomposition of EC according to embodiments of the invention. Most surfaces were covered with 1-2 multilayer graphene flakes.

Figure 20:
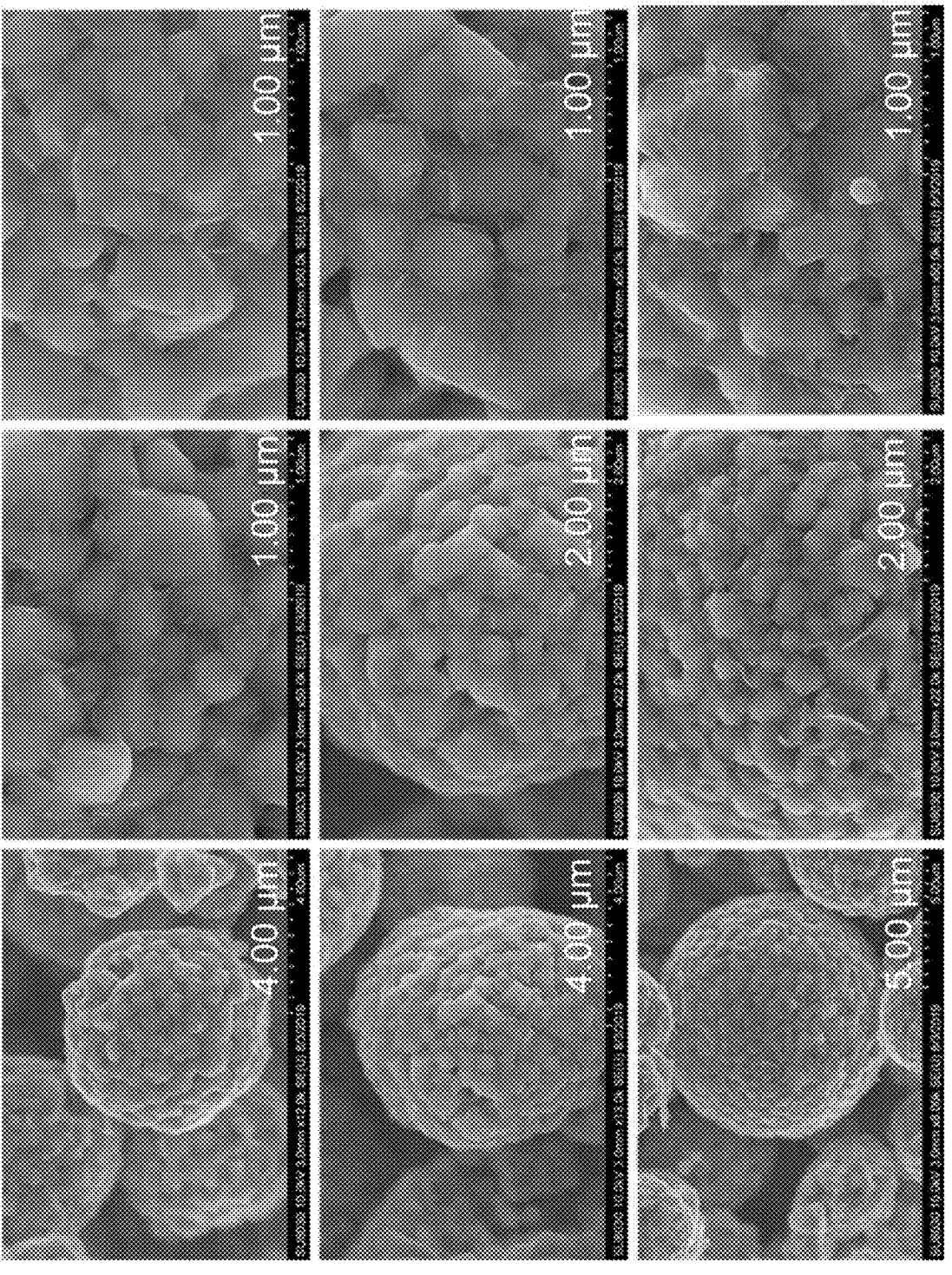

FIG. 20 shows scanning electron microscopy (SEM) images of NCA particles coated with graphene following thermal decomposition of EC according to embodiments of the invention.

Figures 4A, 4B, 4C:
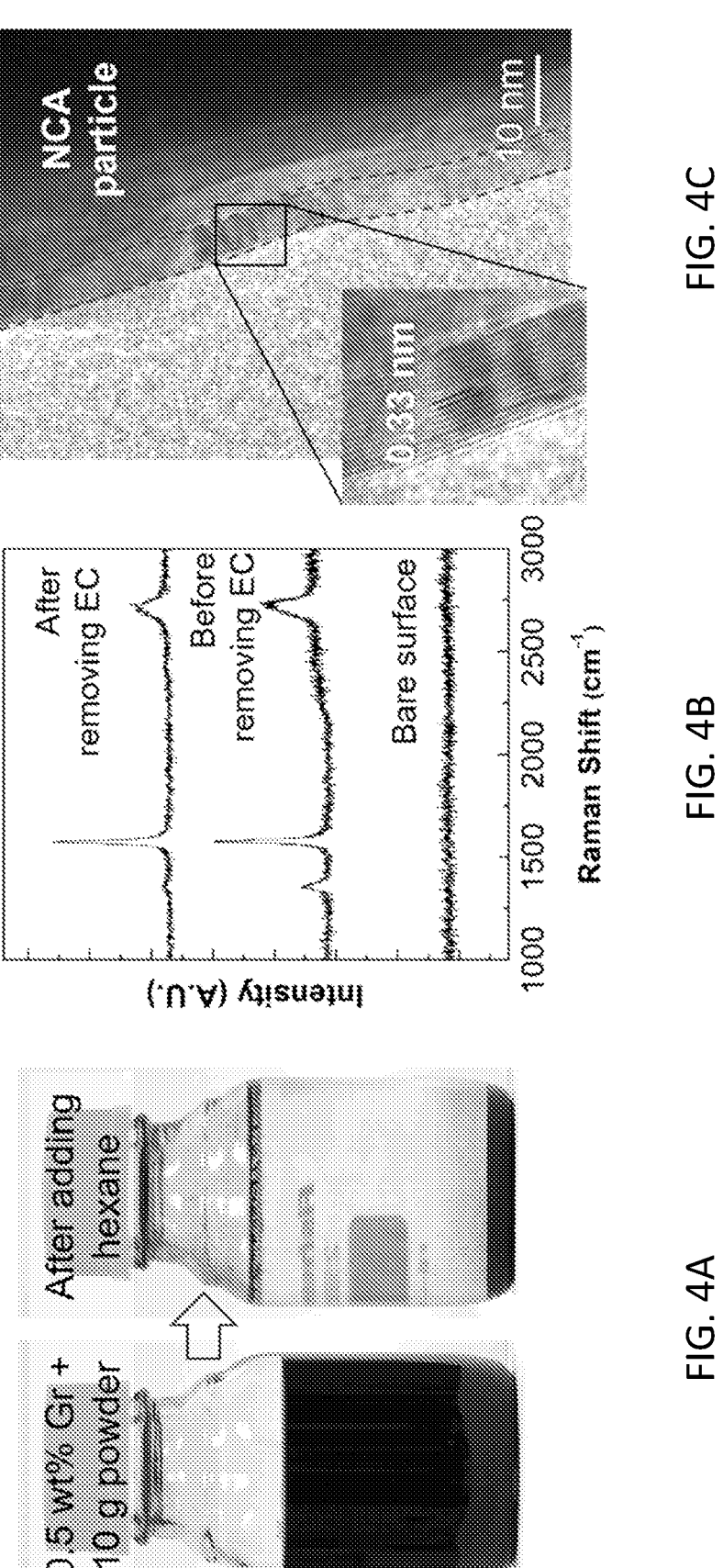
FIGS. 4A-4F show scaled-up coating and characterization following ethyl cellulose removal according to embodiments of the invention.
Figures 4D, 4E, 4F:
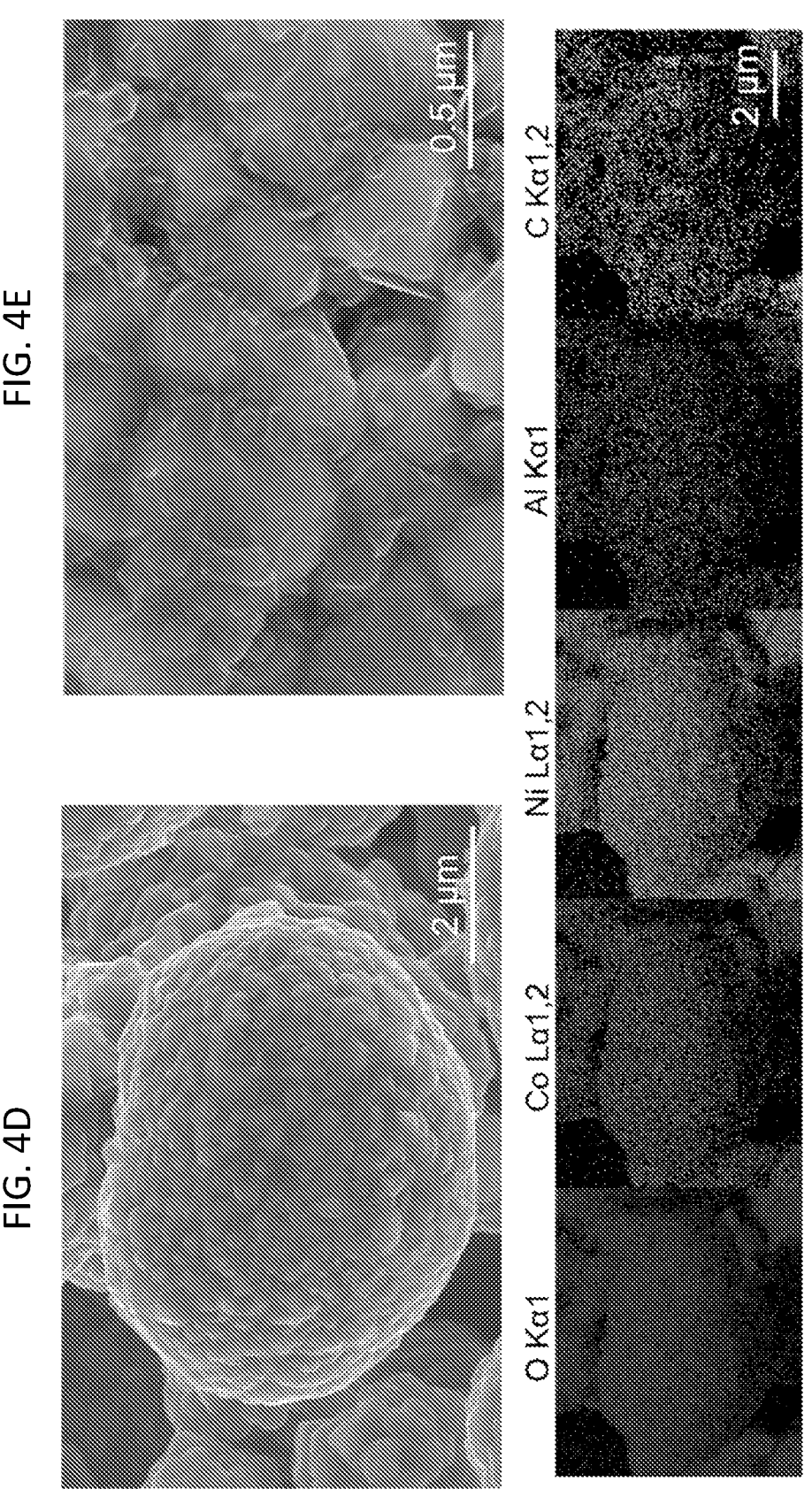
Figure 21:
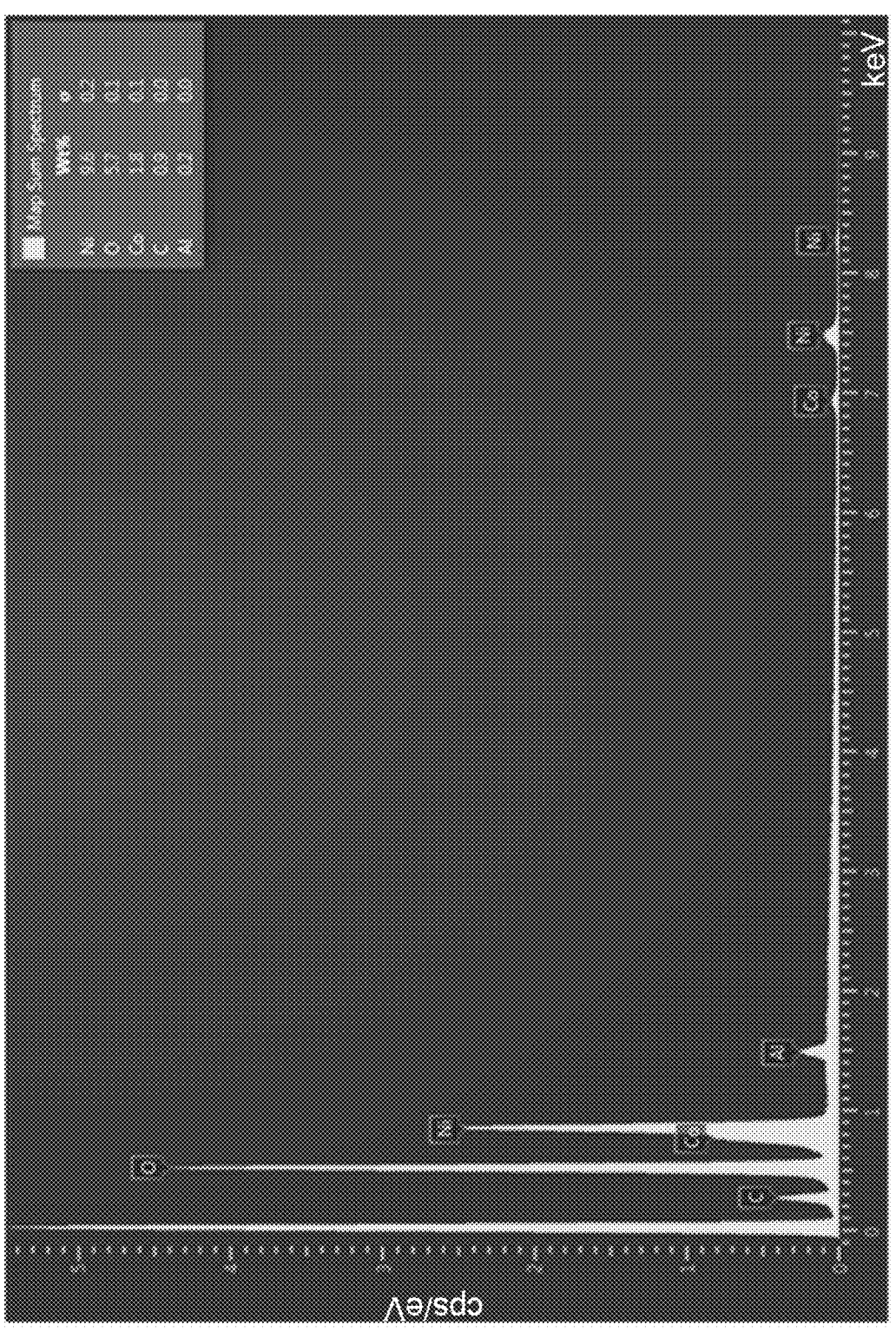

FIG. 21 shows energy-dispersive spectroscopy (EDS) results that correspond to FIG. 4F according to embodiments of the invention.

Figure 22:
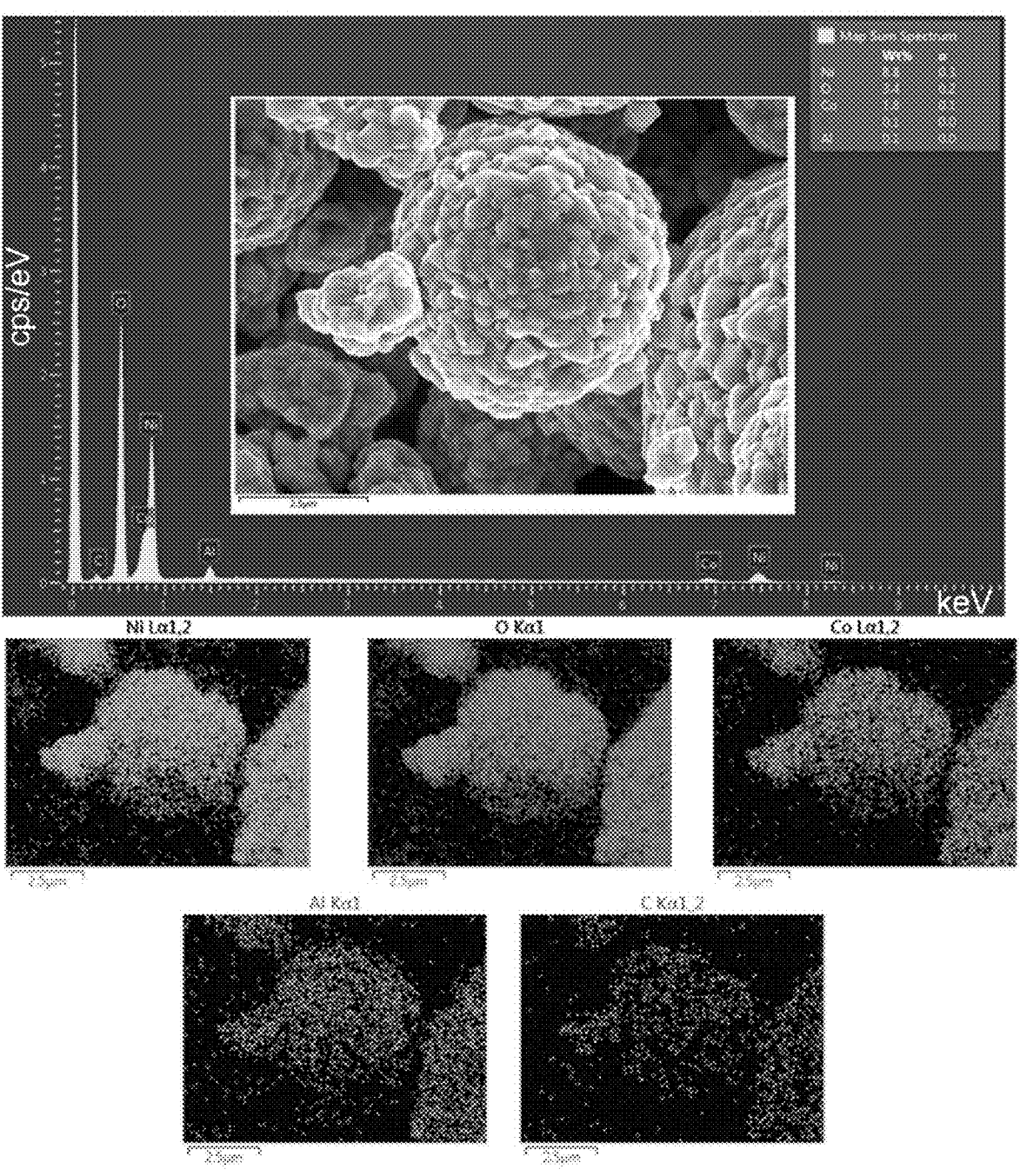

FIG. 22 shows EDS results for pristine NCA particles according to embodiments of the invention, showing virtually no carbon signal.

Figure 23:
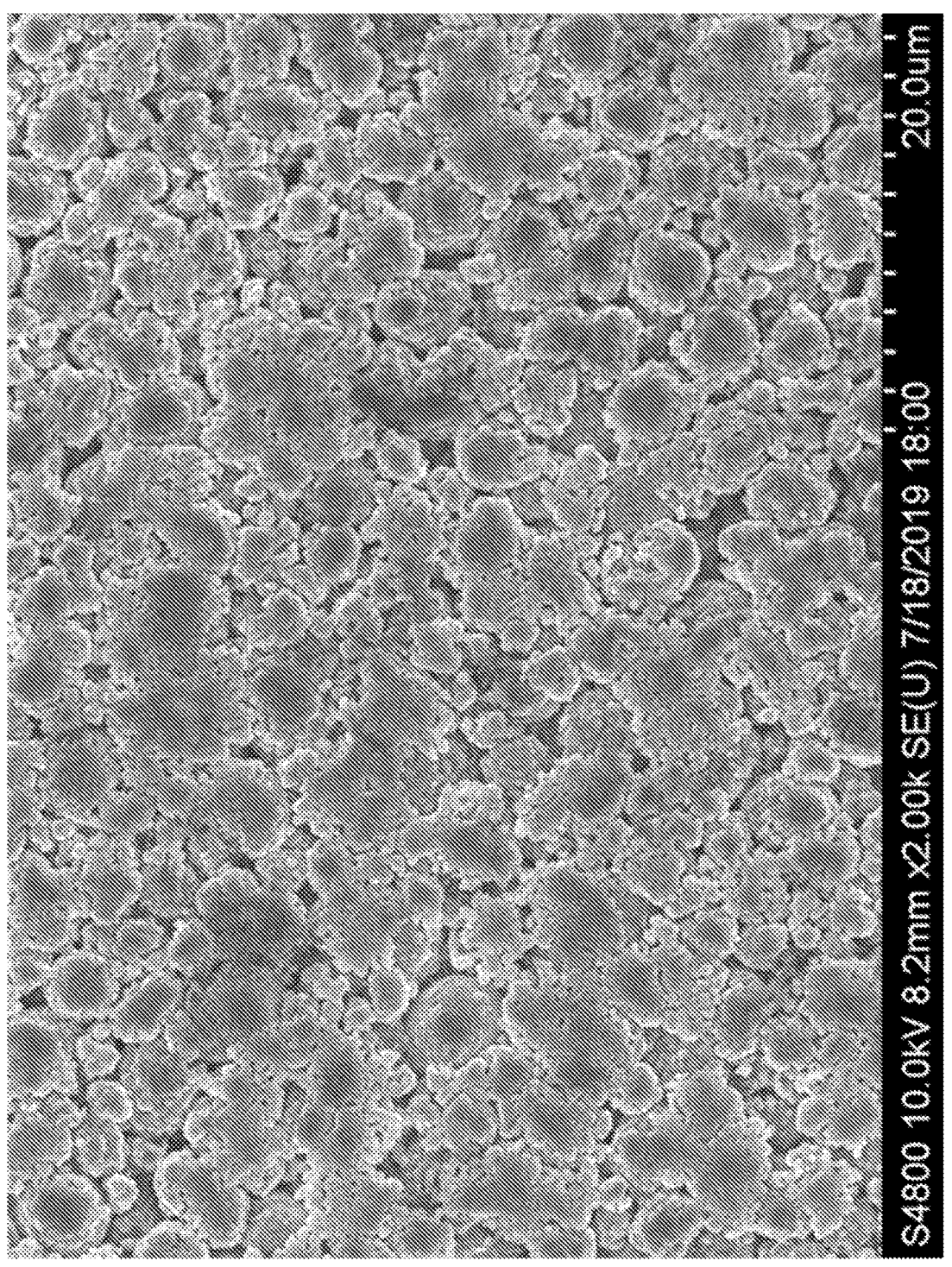

FIG. 23 shows the 0.5 wt % carbon black electrode is dominated by NCA particles, according to embodiments of the invention, suggesting that many of the NCA particles are not well-connected electrically.

Figures 24A, 24B, 24C:
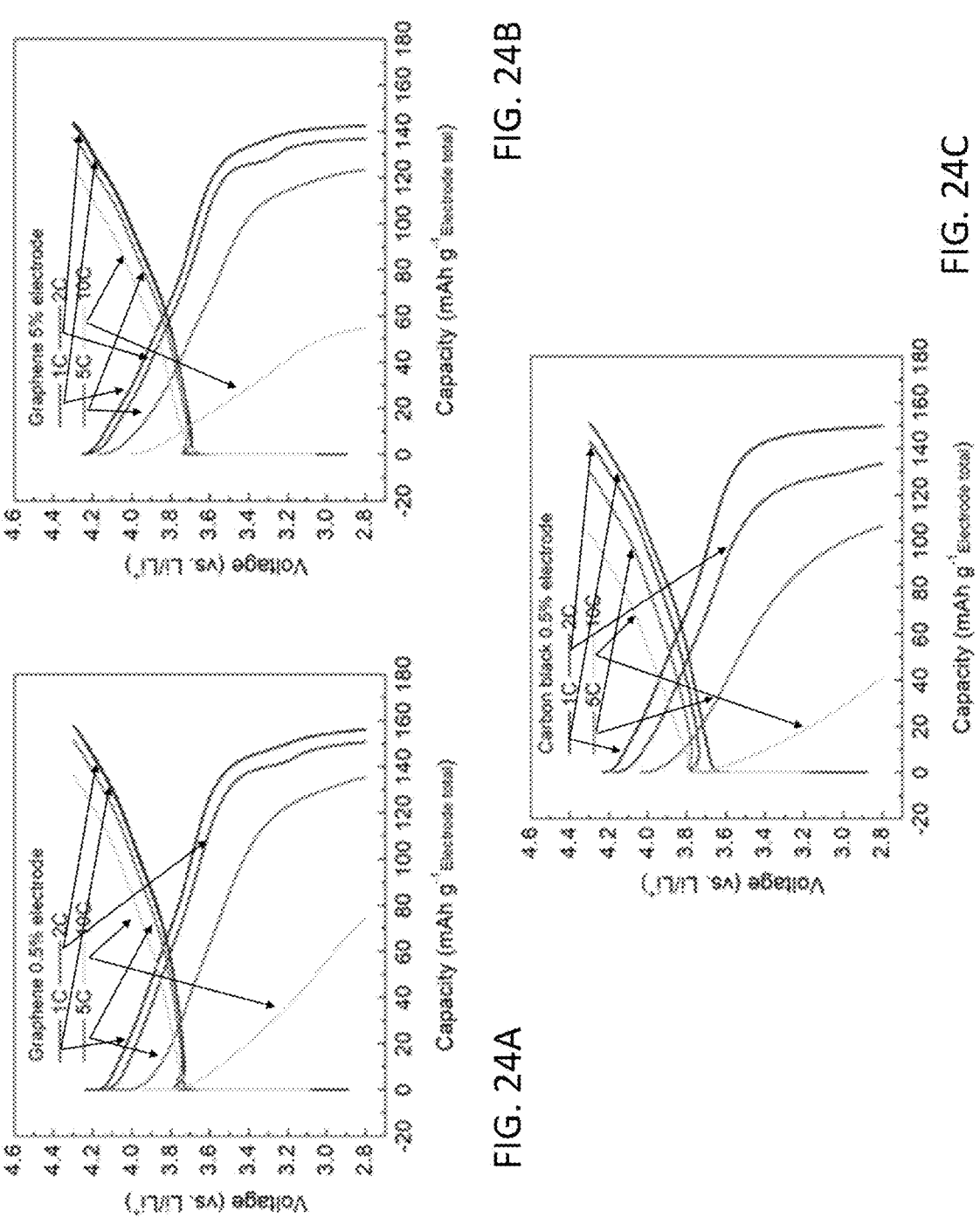

FIGS. 24A-24C show galvanostatic profiles as a function of rate for: FIG. 24A: graphene 0.5 wt % electrode, FIG. 24B: carbon black 5 wt % electrode, and FIG. 24C: carbon black 0.5 wt % electrode, according to embodiments of the invention. The electrodes were charged to 4.3 V at a rate of 1 C and discharged to 2.8 V with rates of 1 C, 2 C, 5 C, and 10 C.

Figure 25A:
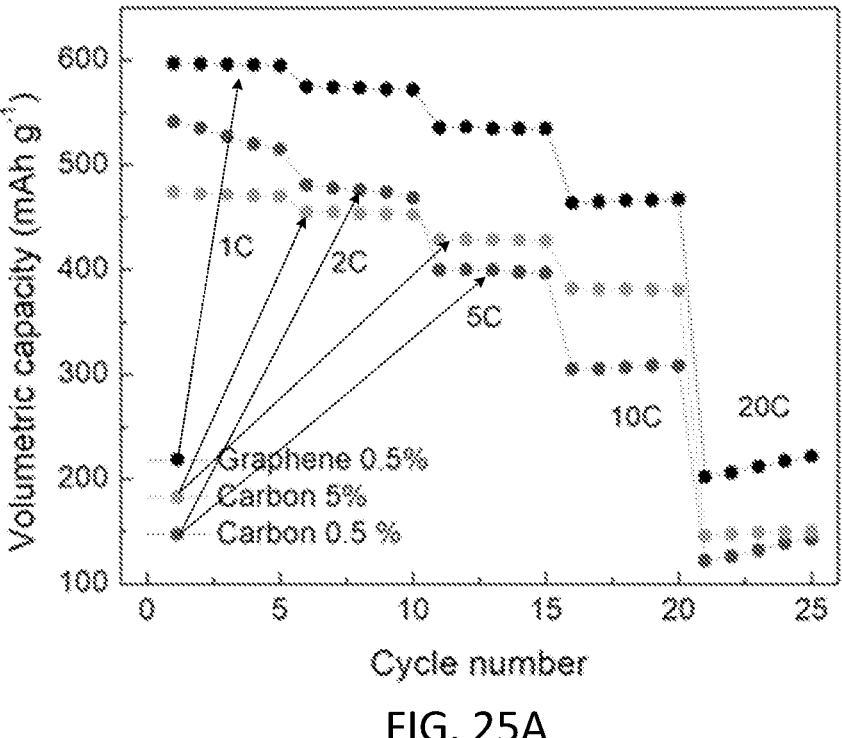
Figure 25B:
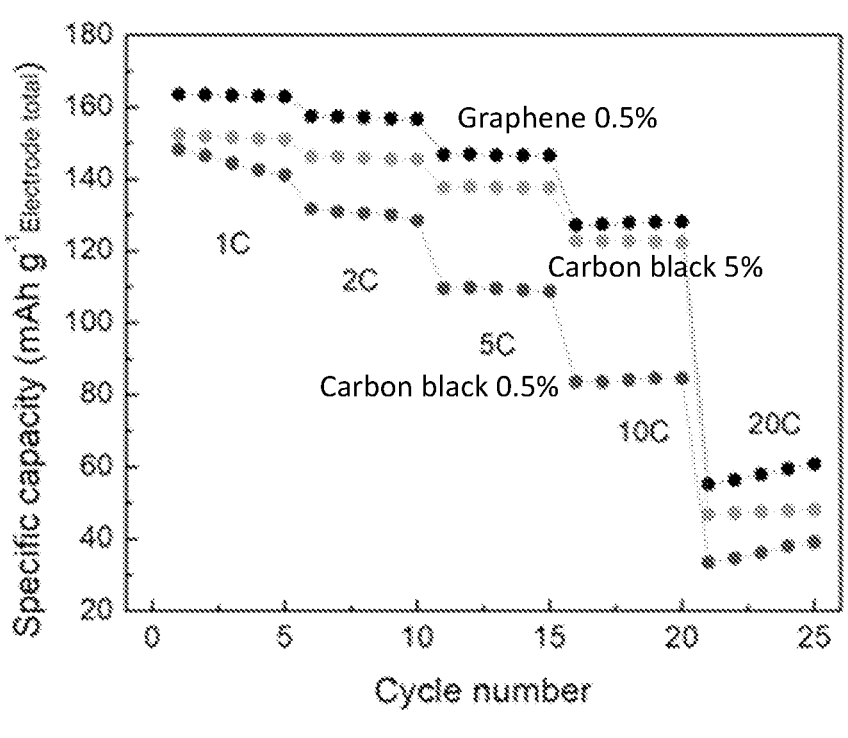

FIGS. 25A-25B show rate capability of 0.5 wt % graphene, 0.5 wt % carbon black, and 5 wt % carbon black electrodes at an areal loading of 6 mg cm$^{-2}$, according to embodiments of the invention. FIG. 25A: Volumetric capacity and FIG. 25B: specific capacity.

Figure 26:
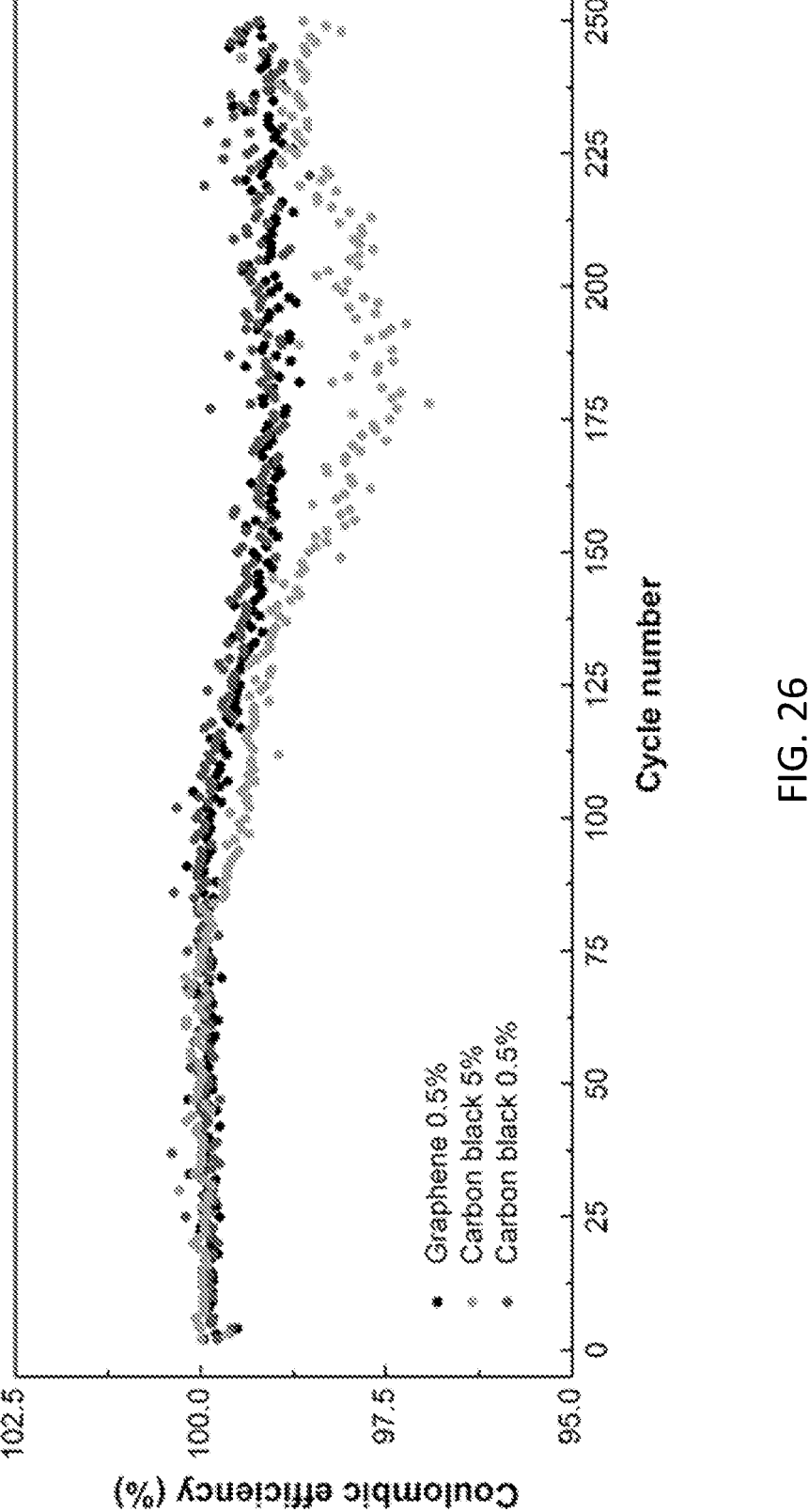

FIG. 26 shows Coulombic efficiency for 1 C charge/discharge cycling according to embodiments of the invention. The 0.5 wt % carbon black electrode showed significantly lower coulombic efficiency after 50 cycles. On the other hand, the 0.5 wt % graphene and 5 wt % carbon black electrodes showed about 99.7% coulombic efficiency after more than 100 cycles.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Ni-rich layered cathodes, such as $LiNi_{0.8}Co_{0.15}Al_{0.05}O_2$ (NCA) and $LiNi_{0.8}Co_{0.1}Mn_{0.1}O_2$ (NCM), are among the most successful classes of lithium-ion battery (LIB) cathode materials due to their reversible gravimetric capacities approaching about 200 mAh $g^{-1}$. This class of cathode materials surpasses the capacity limits of conventional $LiCoO_2$ (140 mAh $g^{-1}$) due to the increased range of Ni-based redox chemistry. Typically, these materials are synthesized as primary nanoparticles that then aggregate into a microscale secondary particle. As this scheme enables access to the large active surface area of the primary nanoparticles and the high packing density of the secondary microparticles, the volumetric capacity of Ni-rich cathode materials has been projected to reach about 690 mAh per cc. Additional higher-capacity cathode materials are also under development, such as rock-salt and pure $LiNiO_2$ phases, but their cyclic stability has not yet reached sufficient levels for most practical applications.

While the Ni-rich layered cathodes possess intrinsically high capacities, the actual volumetric and specific capacities of the entire electrode also depend on the inactive components. In addition to the active material, conventional LIB electrodes include a conductive additive (most commonly carbon black) and a polymer binder (typically polyvinylidene fluoride (PVF), polyvinylidene difluoride (PVDF), or carboxymethyl cellulose (CMC)). Furthermore, intra-electrode pores that provide lithium-ion pathways can occupy more than 25% of the total electrode volume. The conductive additive and electrode porosity play a central role in determining battery kinetics because they are responsible for electron and lithium-ion transport, respectively. The polymer binder is also critical for stable electrochemical cycling by promoting and maintaining adhesion of the carbon conductive additive to the active materials. Despite their importance, the goal is to minimize these inactive components since they compromise the overall electrode specific capacity. Even more concerningly, the inclusion of inactive components significantly cuts down the volumetric capacity of the electrode due to the low tap density of traditional carbon additives as schematically depicted in FIG. 1A. For example, the overall compressed density for a standard NCA electrode is significantly decreased from about 3.6 g $cc^{-1}$ to about 2.9 g $cc^{-1}$ for a carbon black loading of 5 wt % (Table 1), which is on the low end of typical conductive additive loadings in previous literature reports.

compatibility with the electrochemical environment inside of a LIB, graphene is a leading candidate for coating active material particles. Assuming that graphene forms a conformal contact on the active material particle surface, as shown in FIG. 1D, electron transport will be uniformly distributed, thus minimizing current crowding and electrode polarization. Although mass production of high-quality graphene has already been developed, the lack of scalable coating methods that result in conformally coated LIB active material particles has prevented the full realization of this strategy. In particular, previously attempted schemes for blending graphene with LIB active material particles has either resulted in insufficient electrical conductivity (and thus the need to still add carbon black conductive additives) or crumpling of graphene, both of which lead to poor tap densities and compromised volumetric capacities.

One of the objectives of this invention is to disclose conformal, ultrathin, conductive graphene coatings on LIB active materials particles using a scalable Pickering emul-

TABLE 1

Comparison of electrode packing density as a function of the carbon loading in the electrode. The prepared electrodes were rolled until just before cracks appeared. The numbers in parentheses next to the packing densities indicate the standard deviation.

| Component | Ratio (wt %) | | | | Density (g cm$^{-3}$) |
|---|---|---|---|---|---|
| NCA | 90 wt % | 98.7 wt % | 98.7 wt % | 95 wt % | 4.85 |
| Carbon | 5 wt % | 0.5 wt % | 0.5 wt % | 2.2 wt % carbon | Carbon |
| Loading | carbon | carbon | graphene | black + 0.8 | black |
| | black | black | coating | wt % of graphite | 0.16 |
| PVDF | 5 wt % | 0.8 wt % | 0.8 wt % | 2 wt % | 1.6 |
| Packing density (g cc$^{-1}$) | 2.93 (6) | 3.56 (1) | 3.63 (1) | 3.4 | — |
| Reference | This invention | This invention | This invention | Ref. [1] | — |

An enticing solution for maximizing both specific and volumetric capacity of LIB electrodes is to minimize the conductive additive loading. This strategy also has the potential to limit the loading of binders since the total surface area of the electrode components is reduced. However, it has proven difficult to construct LIBs that deliver acceptable electrochemical performance at low conductive additive loadings. To illustrate the challenge, FIG. 1B shows a magnified schematic of an electrode with minimal loading of carbon black. Because the carbon black particles have a spherical shape with a typical diameter of about 100 nm, a percolating electrical network is difficult to form unless a significant amount of carbon black is blended into the electrode to fill the interstitial space. Moreover, point contacts between the carbon black and active material particles lead to current concentration that cause resistive drops and over potential issues. These issues tend to be exacerbated at industrially relevant active material areal loadings (about 10 mg $cm^{-2}$) that require large electrode thicknesses.

These limitations of particle-based conductive additives can potentially be overcome by an electrode design where each active material particle is coated with a thin electrically conductive coating according to this invention, as shown in FIG. 1C. In addition to achieving ultrahigh active material packing densities, this design reduces lithium-ion tortuosity since it minimizes the internal structural complexity of electrodes that incorporate carbon black particles. Due to its high electrical conductivity, atomically thin nature, and sion method, which overcome the above-noted limitations. Since this approach employs high-quality, solution-exfoliated graphene that possesses exceptional electrical conductivity, only 0.5 wt % graphene is required to achieve high electrochemical performance in thick electrodes that possess industrially relevant active material areal loadings (about 11 mg $cm^{-2}$). Due to the exceptionally low inactive material loading, the resulting NCA electrodes achieve specific and volumetric capacities within about 98% of the theoretical limits for NCA materials. The efficient electron and lithium-ion transport in these electrodes also leads to superlative rate capability, while the conformal graphene coating mitigates electrochemical degradation mechanisms and consequently enhances cycle-life. While demonstrated in the disclosure for NCA cathodes, this Pickering emulsion coating scheme can likely be generalized to other active material particles, thus providing a pathway to theoretical specific and volumetric capacities in practical LIB electrodes.

According to one aspect of the invention, the method for fabricating a composite material using a scalable Pickering emulsion approach includes forming an emulsion mixture of active material particles and graphene emulsion droplets containing immiscible first and second solvents and a solid-state emulsifier of graphene. The first and second solvents are adapted such that the second solvent resides in an interior of the graphene emulsion droplets with the first solvent as an exterior solvent, and the active material particles reside in the interior of the emulsion droplets.

In some embodiments, a boiling point of the second solvent is lower than that of the first solvent. For example, the first solvent comprises, but is not limited to, acetonitrile, heptane, water, or acetic acid, and the second solvent comprises, but is not limited to, pentane, cyclohexane, acetonitrile, benzene, hexane, or chloroform. It should be appreciated that as long as two immiscible solvents are prepared and the second solvent has a lower boiling point than that of the first solvent, any combination of the first and second solvents can be used to practice the invention. Table 2 lists some examples of combinations of the first and second solvents that can be used to practice the invention.

TABLE 2

Various combinations of the first and second solvents.

| The first solvent | The second solvent |
|---|---|
| acetonitrile | pentane |
| acetonitrile | cyclohexane |
| heptane | acetonitrile |
| water | benzene |
| water | hexane |
| water | pentane |
| water | chloroform |
| acetic acid | hexane |

A volume ratio of the first solvent to the second solvent can be in a range from about 5:4 to about 5:1.

In some embodiments, an average size of the graphene emulsion droplets changes with changing the volume ratio of the first solvent to the second solvent, and a concentration of said graphene in the base solution. In some embodiments, the average size of the graphene emulsion droplets is reduced with decreasing content of the second solvent, and is less than about 5 μm at the 5:1 volume ratio of the first solvent to the second solvent.

In some embodiments, said graphene comprises solution-exfoliated graphene. The weight ratio of said graphene to the active material particles can be in a range from about 1:400 to about 1:100, preferably, about 1:200.

In one embodiment, said forming the emulsion mixture comprises dispersing said graphene into the first solvent to form a base solution; and mixing the second solvent with the base solution to form the graphene emulsion droplets by sonication; and inserting the active material particles into the graphene emulsion droplets by agitation.

In another embodiment, said forming the emulsion mixture comprises dispersing said graphene into the first solvent to form a base solution; dispersing the active material particles into the base solution to form a first mixture; adding the second solvent in the first mixture to form a second mixture and sonicating the second mixture so as to insert the active material particles into the graphene emulsion droplets.

In addition, the method also includes a drying process for the emulsion mixture, which needs to be carefully controlled in order to achieve a conformal graphene coating on the active material particles. The drying process is performed with subsequent evaporation of the second solvent and the first solvent through fractional distillation so as to form the composite material having each surface of the active material particles conformally coated with said graphene.

For example, in one embodiment, the first solvent is acetonitrile having the boiling point of 82° C., and the second solvent is hexane having the boiling point of 68° C. The fractional distillation is performed with a rotary evaporator having a bath temperature set to about 50° C., and a pressure set at about 0.6 atm for a first period of time pressure to completely and selectively remove the hexane, resulting in a controlled collapse of the emulsion droplets and a conformal graphene coating on the active material particles, and the pressure subsequently lowered to under 0.2 atm for a second period of time to fully remove the acetonitrile, leading to conformally graphene-coated active material particles.

In some embodiments, the graphene emulsion droplets may also contain ethyl cellulose (EC) as an additive for increasing dispersity and emulsifier characteristics of said graphene. A weight ratio of said graphene to said EC can be in a range from about 1:0 to about 1:3, preferably, about 1:2. In one embodiment, thermal annealing at a temperature in a range of about 150-350° C., preferably, about 250° C. is performed in an oxidizing environment to decompose the majority of EC, with the remaining amorphous carbon residue possessing a high $sp^2$-carbon content that facilitates electron transport between graphene flakes.

According to another aspect of the invention, the composite material includes graphene; and active material particles. Each surface of the active material particles is conformally coated with said graphene. In some embodiments, said each surface of the active material particles is conformally coated with said graphene by a Picking emulsion process, as discussed above.

In some embodiments, the composite material may have amorphous carbon with $sp^2$-carbon content that facilitates electron transport between graphene flakes. The amorphous carbon is an annealation product of EC.

In some embodiments, said graphene comprises solution-exfoliated graphene. In some embodiments, the weight ratio of said graphene to the active material particles is in a range from about 1:400 to about 1:100, preferably, about 1:200.

In some embodiments, the active material comprises lithium cobalt oxide, lithium iron phosphate, lithium manganese oxide, lithium nickel manganese cobalt oxide, lithium nickel cobalt aluminum oxide, or a combination thereof.

In some embodiments, the active material comprises nickel-rich lithium oxides.

In some embodiments, the active material comprises $LiNi_{0.8}Co_{0.15}Al_{0.05}O_2$ (NCA), $LiNiO_2$ (LNO), $LiMn_{1.5}Ni_{0.5}O_4$ (LMNO), $LiNi_xMn_yCo_zO_2$ (NMC, where x+y+z=1), $LiNi_{0.8}Co_{0.2}O_2$ (LNCO), or $Li_wNi_xMn_yCo_zO_2$ (lithium-rich NMC, where w>1, x+y+z=1). The active material may be doped with elements including Al, B, Zr, Nb, Fe, Cr, Cu, Mo, W, and/or V.

One aspect of the invention also relates to an electrode and an electrochemical device such as a lithium-ion battery (LIB) including the electrode. The electrode is formed of a composite material comprising graphene, and active material particles. Each surface of the active material particles is conformally coated with said graphene, as discussed above.

To achieve the high energy densities demanded by emerging technologies, LIB electrodes need to approach the volumetric and specific capacity limits of their electrochemically active constituents, which requires minimization of the inactive components of the electrode. However, a reduction in the percentage of inactive conductive additives limits charge transport within the battery electrode, which results in compromised electrochemical performance. The shortcomings are overcome by the electrode design of the invention, where the electrode does not need to include inactive conductive additives, such as carbon black, and achieves efficient electron and lithium-ion transport kinetics at exceptionally low conductive additive levels and industrially relevant active material areal loadings. For example, in some embodiments, the electrode with only 0.5 wt % graphene achieves an active material areal loading of greater than about 10 mg cm$^{-2}$, and at least about 98% volumetric and specific capacities of the theoretically limits of the active material.

Moreover, the conformal graphene coating mitigates degradation at the cathode surface, thus providing improved electrochemical cycle life. For example, in some embodiments, the electrode with only 0.5 wt % graphene retains about 91.5% of its initial volumetric capacity over 100 cycles, and maintains about 99.7% Coulombic efficiency. Furthermore, the electrode with only 0.5 wt % graphene retains about 70% of its initial volumetric capacity over 250 cycles.

The morphology of the electrodes also facilitates rapid lithium-ion transport kinetics, which provides high rate capability. Overall, this electrode design concurrently approaches theoretical volumetric and specific capacity limits without tradeoffs in cycle life, rate capability, or active material areal loading.

According to the invention, the Pickering emulsion method results in a highly conformal graphene coating that allows the inactive component level to be reduced by an order of magnitude, resulting in unprecedented battery performance metrics. Importantly, the Pickering emulsion method is also highly manufacturable due to its scalability, high throughput, and amenability to recycling.

Further, the Pickering emulsion coating method concurrently overcomes the limited scalability and quality of previous graphene coatings. In particular, pre-existing strategies for coating active materials for Li-ion batteries have been conducted using functionalized graphene, such as graphene oxide or reduced graphene oxide, rather than utilizing high-quality pristine graphene. In addition, these pre-existing strategies have employed harsh chemicals that can lead to further damage to the graphene coating and/or the underlying electrode materials. Furthermore, due to the conformal nature of the coating, we achieve an order of magnitude reduction in the inactive components in Li-ion battery electrodes, which results in unprecedented battery performance metrics including high specific and volumetric capacity, rate capability, cycle-life, and Coulombic efficiency.

Applications of the invention includes, but are not limited to, Li-ion batteries, graphene coatings, cathode materials, conductive additives, and so on.

Among other things, the invention has at least the following advantages over the existing art.

Existing scalable coating methods are only available for graphene oxide or low-quality graphene. On the other hand, the Pickering emulsion method of the invention can be applied to not only pure graphene but also functionalized graphene without any additional chemical/physical damage.

Existing coating methods using high-quality graphene can only coat materials at small scales. However, the Pickering emulsion method of the invention can coat materials in a massively parallel manner.

The Pickering emulsion method of the invention results in highly uniform graphene coatings compared with other existing coating methods.

The Pickering emulsion method of the invention is scalable, high throughput, and amenable to recycling.

The conformal graphene coatings of the invention allow the percentage of inactive materials in battery electrodes to be reduced by an order of magnitude.

Electrodes using the graphene coatings of the invention deliver superior specific and volumetric capacity, rate capability, cycle-life, and Coulombic efficiency for Li-ion batteries.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLE

Concurrently Approaching Volumetric and Specific Capacity Limits of Lithium Battery Cathodes Via Conformal Pickering Emulsion Graphene Coatings This exemplary example discloses, among other things, conformal, ultrathin, conductive graphene coatings on LIB active materials particles using a scalable Pickering emulsion method. Since this approach employs high-quality, solution-exfoliated graphene that possesses exceptional electrical conductivity, only 0.5 wt % graphene is required to achieve high electrochemical performance in thick electrodes that possess industrially relevant active material areal loadings (about 11 mg cm$^{-2}$). Due to the exceptionally low inactive material loading, the resulting NCA electrodes achieve specific and volumetric capacities within about 98% of the theoretical limits for NCA materials. The efficient electron and lithium-ion transport in these electrodes also leads to superlative rate capability, while the conformal graphene coating mitigates electrochemical degradation mechanisms and consequently enhances cycle-life. While demonstrated here for NCA cathodes, this Pickering emulsion coating scheme can likely be generalized to other active material particles, thus providing a pathway to theoretical specific and volumetric capacities in practical LIB electrodes.

Preparation of Graphene

Exfoliation of graphite was implemented by mixing 6,000 g of flake graphite and 200 g of 4 cP ethyl cellulose, both from Sigma Aldrich, in a reservoir tank containing 5 L of 200-proof ethanol (Decon Labs, Fisher Scientific Co). This mixture was continuously cycled through a 200 L inline shear mixer (Silverson Machines). After 23 hr, the obtained mixtures were centrifuged with an Avanti J-26 XPI centrifuge using a JLA 8.1000 rotor, both from Beckman Coulter Inc., at 6,500 rpm for 0.5 hours. The ethanol-based supernatant containing polydisperse graphene with EC was then collected and flocculated by adding NaCl saltwater. The sedimented solids of graphene, EC, and salt were collected, combined in a 1 L Büchner funnel, and repeatedly washed with deionized water. The solid material was then transferred to a Pyrex container and dried in ambient conditions using a 150 W infrared lamp to fully dehydrate the sample. The dried graphene and EC mixture were dispersed in acetonitrile (Sigma Aldrich) using horn sonication at 30-40% amplitude for 1 hour.

Conformal Graphene Coatings Via Pickering Emulsion Processing

Figure 2A:
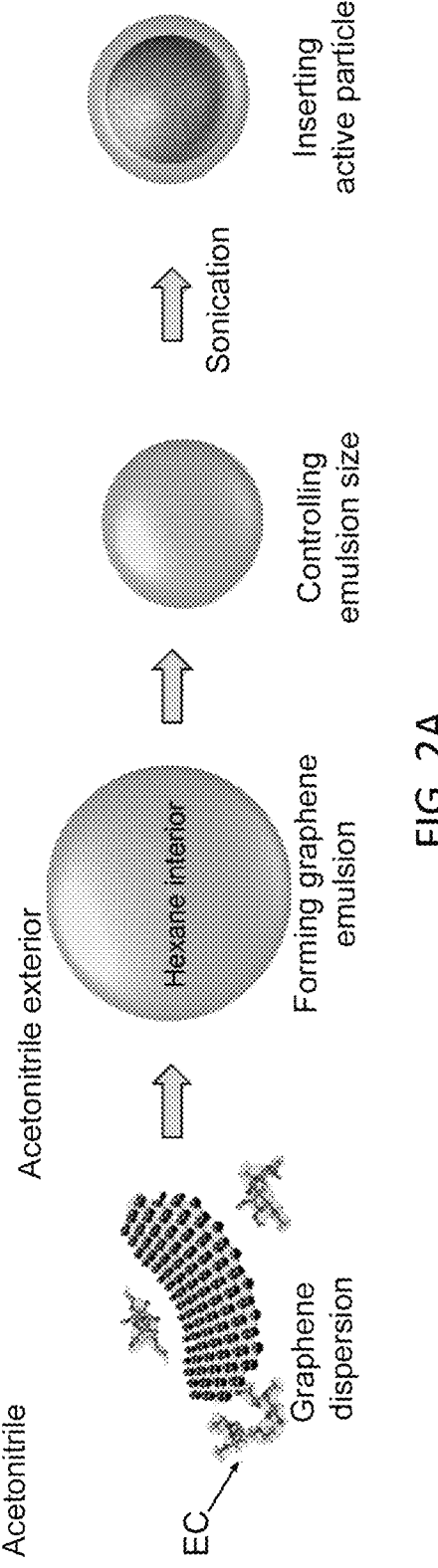
Figure 7A:
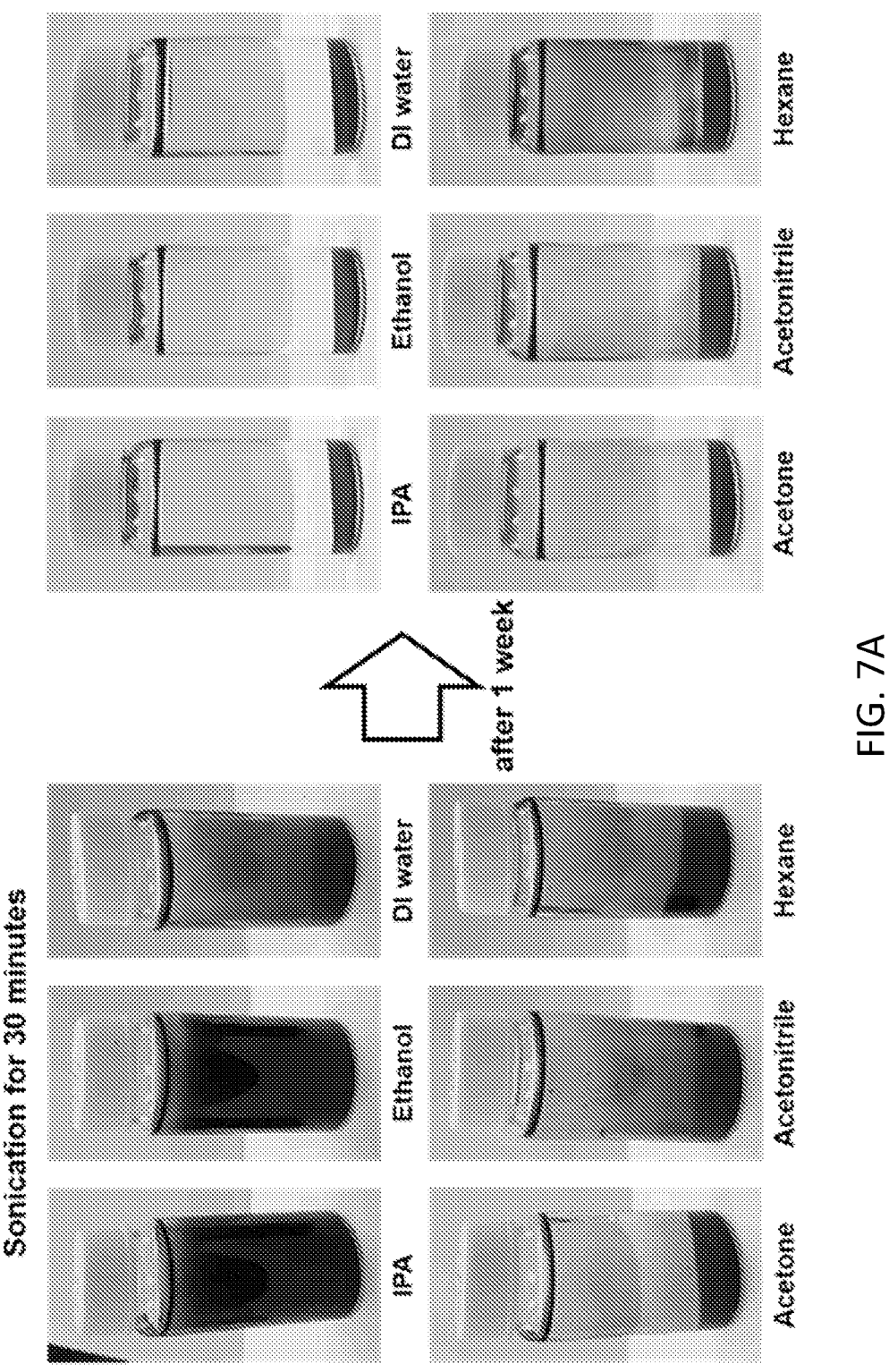
FIGS. 7A-7B are respectively photographs of NCA particles mixed in various solvents and then stored for 1 week, and X-ray diffraction patterns of dried particles after a week of storage according to embodiments of the invention. X-ray diffraction (XRD) patterns were measured using Scintag with Cu-Kα radiation ($\lambda$=1.5406 Å). The acceleration voltage was 40 kV with a 20 mA current. The patterns were collected with a 2θ scan mode from 10-70°. No significant changes were observed in the XRD patterns.
Figure 7B:
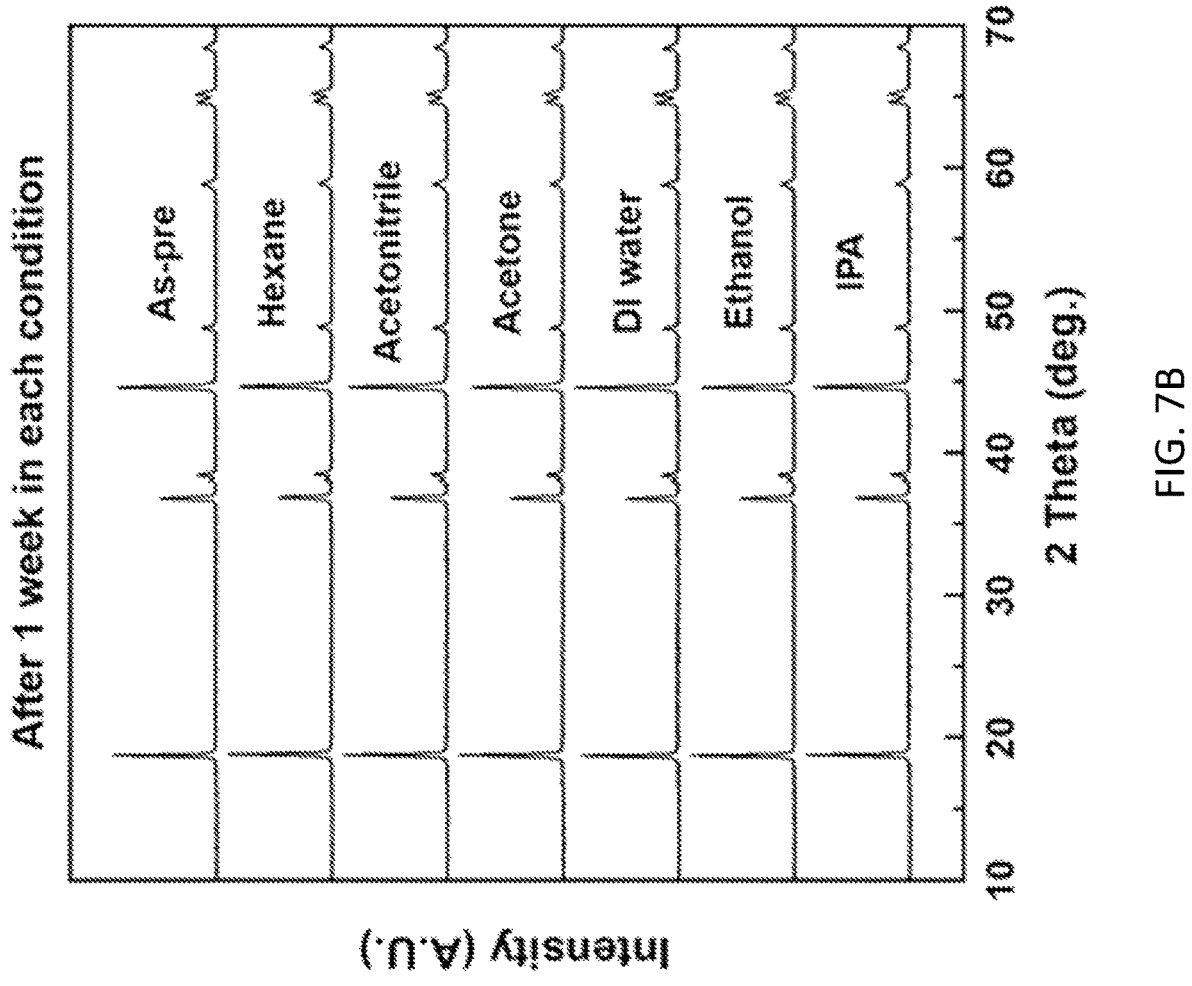
Figure 8:
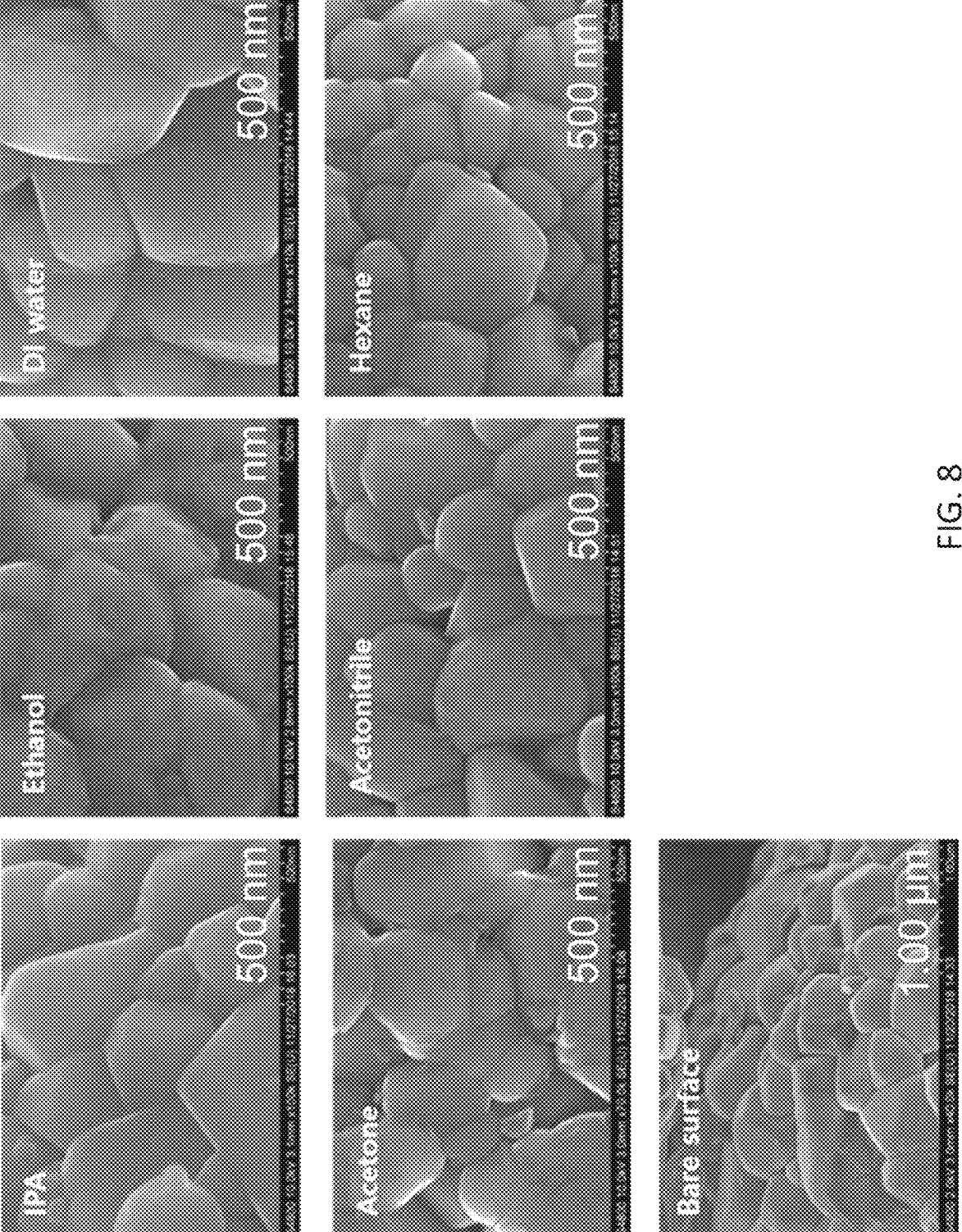
FIG. 8 shows scanning electron microscopy (SEM) images of NCA particles following 1 week of storage in the listed solvents according to embodiments of the invention.

Pickering emulsions result from two immiscible solvents, where solid-state emulsifiers stabilize the interfaces of the emulsion droplets. As the first step in achieving a conformal graphene coating, a Pickering emulsion was formed using acetonitrile and hexane as immiscible solvents and graphene (Gr) as a solid-state emulsifier as schematically shown in FIG. 2A. The conditions of the Pickering emulsion were chosen such that the lower boiling point solvent (i.e., hexane: boiling point=68° C.) resides in the interior of the emulsion droplets with the higher boiling point solvent (i.e., acetonitrile: boiling point=82° C.) as the exterior solvent. In addition, ethyl cellulose (EC) was used as an additive for increasing the dispersity and emulsifier characteristics of graphene. Since NCA particles disperse preferentially in hexane compared to acetonitrile, the NCA particles resided in the interior of the emulsion droplets. The choice of solvents for the Pickering emulsion was based on compatibility with NCA (FIGS. 7A-8) in addition to the low and different boiling points that facilitate the formation of a homogenous graphene coating as discussed further below.

The detailed procedure for forming the Pickering emulsion begins by dispersing graphene into acetonitrile to form a base solution. With regard to the dispersibility of graphene in acetonitrile, it is worth noting that there is still debate over whether the surface chemistry of graphene is hydrophobic or hydrophilic, but it is generally observed that graphene itself is difficult to disperse in many solvents including ethanol, water, and acetonitrile. However, previous studies have demonstrated that stable graphene dispersions can be prepared in ethanol by using EC as a stabilizer. Similarly, we found that graphene can be effectively dispersed in acetonitrile using EC. FIG. 2B shows the degree of dispersion of graphene in acetonitrile as a function of the relative weight ratio of graphene to EC. The graphene itself was derived from liquid phase exfoliation using a procedure as disclosed above. As shown by atomic force microscopy (AFM) in FIG. 2C, the multi-layer graphene flakes possess an average lateral size of about 160 nm and an average thickness of about 3 nm (AFM histogram provided in FIG. 9B). When graphene was dispersed alone in acetonitrile at a concentration of about 0.275 mg mL$^{-1}$ or with a 1:1 weight ratio of EC (in this case, the concentration of EC is also about 0.275 mg mL$^{-1}$), graphene aggregation occurred within about 24 hr following horn ultrasonication as shown in the lower panels of FIG. 2B. On the other hand, when the relative amount of EC was increased (i.e., graphene:EC ratio of 1:2), the resulting graphene dispersion was stable without aggregation for over 1 week.

The optimal 1:2 Gr/EC dispersion in acetonitrile formed a Pickering emulsion once immiscible hexane solvent was added. Specifically, FIG. 2D shows a series of 5 mL Gr/EC in acetonitrile dispersions with decreasing volumes of hexane (left to right, 4 to 1 mL of hexane) following one minute of vortex mixing. The concentrations of Gr and EC in acetonitrile were about 0.275 mg mL$^{-1}$ and about 0.55 mg mL$^{-1}$, respectively. All acetonitrile/hexane (A/H) mixtures showed graphene separation into a top layer in addition to the formation of floating emulsion droplets, which were stable in size for one week. Since the density of hexane (about 0.65 g mL$^{-1}$) is lower than acetonitrile (about 0.79 g mL$^{-1}$), it can be deduced that the interior solvent of the floating droplets is hexane rather than acetonitrile. Consistent with this interpretation, the average size of the emulsion droplets was reduced with decreasing hexane content, as shown in FIG. 2E. Emulsion droplets with diameters exceeding about 100 μm were observed at a 5:4 ratio of acetonitrile to hexane, whereas the emulsion droplet diameter dropped to less than about 5 μm at a 5:1 ratio of acetonitrile to hexane, as shown in FIG. 10. Further reduction in the emulsion droplet size was not observed for even lower hexane content, as shown in FIG. 11. Moreover, the concentration of graphene also altered the average size of the emulsion droplets (FIG. 12), which is an observation that is consistent with other Pickering emulsions.

After preparing the Pickering emulsion, NCA particles were inserted into the emulsion droplets. Given the actual surface area of graphene obtained by the solution-exfoliation process (FIGS. 9A-9B) and the average NCA particle size (FIGS. 13A-13B), the ideal weight ratio of graphene to NCA was determined to be 1:200. Accordingly, about 550 mg of NCA powder was added to about 10 mL of the graphene/acetonitrile solution (about 0.275 mg mL$^{-1}$), and A/H solutions were prepared with ratios of 5:3, 5:2, and 5:1 (left to right in FIG. 2F) via bath sonication. Initially, the emulsion mixture with NCA was homogenously distributed following bath sonication for 10 minutes. However, when the emulsion mixture was then shaken or subjected to vortexing, graphene emulsion droplets immediately formed and sedimented with NCA powders across all A/H ratios as shown in FIG. 2F. In contrast, the mixture without hexane or NCA powder did not show this behavior. The sedimentation of the emulsion droplets suggests the insertion of the relatively dense NCA particles, which is confirmed by optical microscopy shown in lower panels of FIG. 2F and FIG. 2G. Once the NCA particles were inserted, the emulsions remained stable for more than a week.

The right panel of FIG. 2G shows the insertion of NCA particles into an emulsion with an A/H ratio of 5:1, where the size of most droplets is less than 5 μm. In this case, the emulsion droplets encapsulate individual NCA particles (blue arrows 10) or a relatively small number of NCA particles (red arrows 20). When tracking the droplet/particle complex during drying, clear reductions in droplet size are observed, as shown in FIGS. 14A-14C, ultimately resulting in the particles being conformally coated with graphene as confirmed by scanning electron microscopy (FIG. 15). This conformal encapsulation is enabled by two factors. First, the stable average size of droplets at a 5:1 A/H ratio is less than 5 μm, which corresponds to the size of individual NCA particles. Second, the NCA particles and the emulsion graphene shells favorably interact, resulting in efficient formation of Pickering emulsion droplets around each NCA particle. In particular, Pickering emulsion droplets form promptly upon agitation when NCA particles are present, whereas the mixture without NCA particles formed emulsion droplets much more slowly.

The drying process needs to be carefully controlled in order to achieve a conformal graphene coating on the NCA particles. For example, when the optimized Pickering emulsion with NCA particles was dried without precise control at standard temperature and pressure (STP), the droplets prematurely burst, resulting in an uneven graphene coating on the NCA particle surface as schematically shown on the left side of FIG. 3A. The optical microscopy image in FIG. 3B shows the results of this uncontrolled STP drying process, where residual graphene flakes are spread around the NCA particles following premature bursting of the emulsion droplets. On the other hand, a conformal graphene coating on the NCA particles is achieved by selective evaporation of the interior hexane solution through fractional distillation as schematically shown on the right side of FIG. 3A. This controlled fractional distillation is achieved with a rotary evaporator, where the bath temperature was set to about 50° C., as shown in FIG. 16. After about 20 minutes at about 0.6 atm pressure, the hexane is completely and selectively removed, as shown in FIG. 3D, resulting in a controlled collapse of the emulsion droplets and a conformal graphene coating on the NCA particles. Following removal of the hexane, the resulting dispersion that includes graphene-encapsulated NCA powders in acetonitrile shows exceptional stability. In particular, even upon stirring, the NCA powder is not separated from the graphene coating, as shown in FIG. 17. Further lowering the pressure in the rotary evaporator to under 0.2 atm results in full removal of the acetonitrile, as shown in FIG. 3D, leading to fully graphene-coated NCA particles. As shown in FIGS. 3E-3H, SEM characterization confirms the effectiveness of fractional distillation in achieving a conformal graphene coating on the NCA particles.

Another advantage of the Pickering emulsion graphene coating scheme is its scalability. FIG. 4A shows about 10 gram-scale processing of NCA powder, which begins by dispersing the NCA powder in about 180 mL of graphene dispersed in acetonitrile, where the weight ratio of graphene to NCA is 1:200. Before adding hexane (FIG. 4A, left), the graphene is well-dispersed in acetonitrile, but the NCA particles sediment and separate from the mixture. Following the addition of about 36 mL of hexane and bath sonication for about 10 minutes, Pickering emulsion droplets form and sediment (FIG. 4A, right) in a manner analogous to FIG. 2F. Subsequent fractional distillation results in NCA powders that are conformally coated with graphene. Since the hexane and acetonitrile solvents are extracted separately through fractional distillation, these solvents can be easily recycled for subsequent Pickering emulsions. In total, the entire coating process takes less than two hours until the graphene-coated NCA powder is completely dried. Due to its scalability, high throughput, and amenability to recycling, the Pickering emulsion process can be straightforwardly applied to large-scale manufacturing.

Following the fractional distillation, the conformal coating on the NCA powder includes graphene and EC. While the presence of EC may be acceptable or perhaps even desirable in some applications, it impedes lithium-ion and electron transport and thus needs to be removed for LIBs. EC is thermally decomposed in oxidizing environments at mild temperatures of about 250° C., which is an annealing condition that is compatible with graphene and active materials in LIBs. Indeed, differential thermal analysis (DTA) and thermogravimetric analysis (TGA) show that the residual EC can be removed following thermal annealing at about 250° C. in an $O_2$ atmosphere, as shown in FIG. 18. Further evidence for EC removal is provided by Raman spectroscopy, as shown in FIG. 4B, where a noticeable reduction in the D band is observed after annealing, which is consistent with previous studies of EC pyrolysis in the presence of graphene. Overall, thermal annealing removes the vast majority of EC, with the remaining amorphous carbon residue possessing a high $sp^2$-carbon content that facilitates electron transport between the graphene flakes. Transmission electron microscopy (TEM) and SEM shown in FIGS. 4C-4E and 19 confirm that the final coating is highly conformal and includes about 10 nm of well-defined graphitic carbon. Moreover, energy-dispersive spectroscopy (EDS) elemental mapping verifies the homogeneity of the carbon coating as shown in FIGS. 4F and 21, whereas the pristine NCA particles shows virtually no carbon signal (FIG. 22).

Electrode Fabrication

The NCA powder was procured from BASF TODA (HED NCA-1050, lot 1270203). Slurries for the electrode were blended with active materials (NCA or graphene-coated NCA), carbon black (MTI corporation, EQ-Lib-SuperP), and PVDF binder (corporation, EQ-Lib-PVDF) with N-methyl-2-pyrrolidone (NMP) using a planetary centrifugal mixer for 15 minutes. The mixed slurry was cast on aluminum foil with an areal loading of about 11 mg cm⁻². The electrodes were dried in a 120° C. oven for 20 minutes and compressed by a roller press (MTI, MSK-HRP-MR100DC). CR2032 coin cells were assembled with lithium metal (MTI corporation, reference electrode), glass fiber (Whatman, separator), and 1.0 M $LiPF_6$ in ethylene carbonate/dimethyl carbonate of 1:1 volume ratio for rate capability testing (Sigma Aldrich, EC/DMC, electrolyte) or 1.2 M $LiPF_6$ in ethylene carbonate/ethyl methyl carbonate of 3:7 volume ratio with 2 wt % of vinylene carbonate for cycle retention testing (Sigma Aldrich, EC/EMC, electrolyte).

Electrochemical Characterization

Electrochemical characterization was conducted with an Arbin battery cycler within the voltage range of about 2.8-4.3 V versus Li/Li⁺. As used herein, 1 C of NCA is defined as 180 mA g⁻¹. Electrochemical impedance spectroscopy was performed using a Biologic VSP Potentiostat. The units used in this disclosure were calculated as follows:

$$\text{Areal loading (mg cm}^{-2}) = (\text{total electrode mass (mg)} - \text{Al foil mass (mg)}) \times \text{active ratio/electrode area (cm}^2); \quad (1)$$

$$\text{Compressed density (packing density, mg cc}^{-1}) = \text{active loading density (mg cm}^{-2})/\text{thickness (cm)}; \quad (2)$$

$$\text{Total electrode specific capacity (mAh g}^{-1}) = \text{capacity (mAh)/total electrode mass (g); and} \quad (3)$$

$$\text{Volumetric capacity (mAh cc}^{-1}) = \text{capacity (mAh)/active mass (mg)} \times \text{compressed density (mg cc}^{-1}). \quad (4)$$

LIB cathodes with an unprecedentedly low conductive additive loading were fabricated using the graphene-coated NCA powders. In particular, a mixture of graphene-coated NCA and PVDF binder were cast on an aluminum current collector in a weight ratio of about 99.2:0.8, which implies that the overall composition of NCA, graphene, and PVDF was about 98.7:0.5:0.8. A high active material areal loading of about 11 mg cm⁻² was used to demonstrate the suitability of the graphene-coated NCA powders for practical LIBs. Two control group electrodes were prepared with different ratios: one with the same carbon additive ratio (i.e., NCA, carbon black, and PVDF in a ratio of about 98.7:0.5:0.8) and another with an order of magnitude higher amount of carbon black (i.e., NCA, carbon black, and PVDF in a ratio of about 90:5:5). The prepared electrodes were compressed utilizing a commercial rolling apparatus until just before cracks appeared in the films. SEM images shown in FIG. 5A show that the thicknesses of the 0.5 wt % graphene, 0.5 wt % carbon black, and 5 wt % electrodes were about 30 about 30 and about 37 respectively. The compressed electrode densities were about 3.6 mg cc⁻¹ for the 0.5 wt % graphene and 0.5 wt % carbon black electrodes, and 2.9 mg cc⁻¹ for the 5 wt % carbon black (Table 2). The compressed electrode density of 3.6 mg cc⁻¹ exceeds the previously highest reported density using NCA materials (about 3.3 mg cc⁻¹) and can be attributed to the exceptionally low carbon content enabled by the conformal graphene coating.

Short lithium-ion diffusion lengths and well-percolating electron transport pathways are ideal attributes for a LIB electrode. Since the 0.5 wt % graphene and 0.5 wt % carbon black electrodes were thinner and contained little to no porous carbon compared with the 5 wt % carbon black electrode, the lower carbon content electrodes are expected to have reduced tortuosity for lithium-ion diffusion. In addition, the conformal graphene coating is beneficial for forming percolating electron transport pathways since the coating can provide a seamless electrical network, even across multi-particle contacts. Moreover, the high electrical conductivity of graphene coupled with its conformal coating geometry is expected to minimize the overall contact resistance to the NCA particles. Top-view SEM images of the electrodes confirm the expected differences in the amount of carbon particles present, as shown in FIGS. 5B and 23, with the 0.5 wt % electrodes consisting almost exclusively of active NCA particles.

To investigate the electronic properties of the as-prepared electrodes, electrical conductivity was measured using the four-point probe method with the results tabulated in Table 2. The electrodes with 0.5 wt % graphene possessed about 80% of the electrical conductivity of the 5 wt % carbon black electrode despite having an order of magnitude less carbon, unlike the 0.5 wt % carbon black electrode that was more than a factor of 2 less conductive. The conformal graphene coating also facilitates charge transport kinetics at the active electrode surface. FIG. 5C shows the Nyquist plots of lithium metal two-electrode cells after one activation cycle for the formation of the solid electrolyte interface (SEI) layer. The Nyquist plots exhibit two semi-circles, which is typical for layered cathode electrodes. The first and second semi-circles were attributed to lithium-ion diffusion through the SEI layer ($R_f$) and charge transfer at the surface ($R_{ct}$), respectively. The graphene-coated NCA electrode showed a significant reduction in $R_f$ and $R_{ct}$ compared to the other electrodes (inset of FIG. 5C) as summarized in Table 3. Resistivities and conductivities of the prepared electrodes were measured by the four-point probe method. The average conductivities were obtained from five measurements for each electrode. Deconvoluted impedances of the solid electrolyte interphase layer ($R_f$) and charge transfer at the surface ($R_{ct}$) were obtained by electrochemical impedance spectroscopy.

TABLE 3

Comparison of NCA electrode charge transport
properties for different carbon loading.

| Electrode | Resistivity ($\Omega \cdot cm$) | Conductivity ($\Omega \ cm^{-1}$) | $R_f(\Omega)$ | $R_{ct}(\Omega)$ |
|---|---|---|---|---|
| Graphene 0.5% | 0.72 ± 0.14 | 1.45 ± 0.34 | 3.9 | 10.2 |
| Carbon black 0.5% | 1.22 ± 0.25 | 0.85 ± 0.19 | 24.2 | 72.4 |
| Carbon black 5% | 0.54 ± 0.03 | 1.86 ± 0.11 | 17.7 | 38.6 |

The electrochemical properties of the as-prepared electrodes were further evaluated using lithium metal half-cells. FIG. 5D presents the galvanostatic profiles of the electrodes at a C/10 rate in the first cycle. The gravimetric capacity of the electrodes was determined not only from the weight of the active materials, but also including the weight of the binder and carbon component in order to focus on the overall electrode capacity. A large irreversible capacity appeared in the first cycle for all electrodes as is typically observed for Ni-rich layered oxide cathodes. The first discharge capacity of the 0.5 wt % graphene electrode was 191 mAh g$^{-1}$, whereas the 0.5 wt % and 5 wt % carbon black electrodes showed 179 mAh g$^{-1}$ and 185 mAh g$^{-1}$, respectively. The gravimetric capacity of NCA itself is typically about 195 mAh g$^{-1}$ for the first discharge. Impressively, the 0.5 wt % graphene electrode achieved 98% of this value even considering all of the inactive components, whereas the 0.5 wt % and 5 wt % carbon black electrodes showed lower practical capacities due to limited electronic transport and a large portion of inactive components, respectively. In addition, an overshooting at the about 3.7 V shoulder appeared in the initial charging profile of the 0.5 wt % graphene electrode as is commonly observed for other coated LIB materials.

The rate capability of the 0.5 wt % graphene electrode outperformed the other electrodes for both volumetric capacity and total electrode gravimetric capacity (FIGS. 5E-5F). The volumetric capacity of the 0.5 wt % graphene electrode was at least 20% higher than the 5 wt % carbon black electrode for all tested current densities as shown in FIG. 5E. This improved volumetric capacity results from the replacement of bulky carbon black with the conformal graphene coating that significantly increases the compressed electrode density. Although the 0.5 wt % carbon black electrode also delivered a high compressed electrode density, it showed much lower rate capability due to its poor electronic percolation. The 0.5 wt % graphene electrode shows similar rate capability advantages for the case of total electrode gravimetric capacity. The galvanostatic profiles of all electrodes are presented in FIGS. 24A-24C. Previous studies have revealed that electrochemical reactions of relatively high-loading electrodes are limited by lithium-ion diffusion in the electrolyte at high C-rates. Consequently, even higher rate performance up to 20 C can be achieved for the 0.5 wt % graphene electrode by reducing the areal loading to about 6 mg cm$^{-2}$, as shown in FIGS. 25A-25B.

Figure 5G:
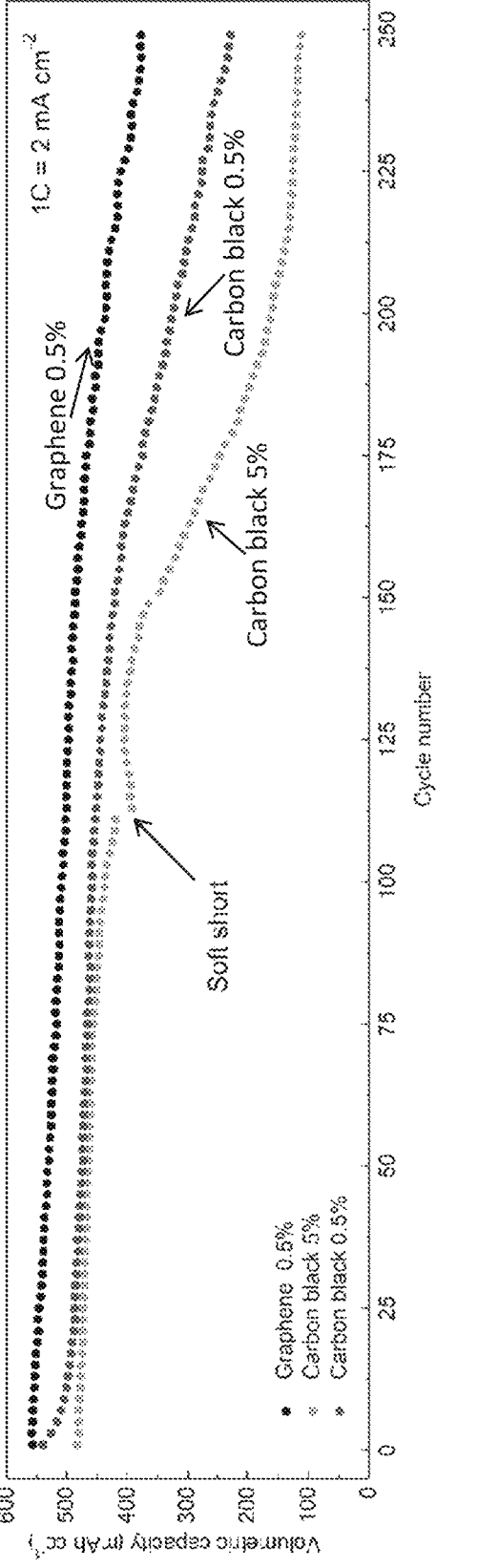

The 0.5 wt % graphene electrode also possessed outstanding cycle retention as shown in FIG. 5G. In the case of the 0.5 wt % carbon black electrode, the capacity retention at 1 C was significantly compromised within the first 10 cycles, which can likely be attributed to an insulating SEI layer on the surface that leads to irreversible degradation of the electronic network. On the other hand, the 5 wt % carbon black and 0.5 wt % graphene electrodes retained 90.5% and 91.5% of their initial volumetric capacities, respectively, over 100 cycles, as shown in FIG. 5G, while also maintaining about 99.7% Coulombic efficiency, as shown in FIG. 26. However, a sudden soft short circuit profile was consistently observed in the 5 wt % carbon black preceding 125 cycles, whereas the 0.5 wt % graphene electrode could be still cycled over 250 times while retaining about 70% of its initial capacity. Previous studies have shown that high-loading electrodes (>10 mg cm$^{-2}$) usually maintain lower than 80% of the initial capacity after 100 cycles. Furthermore, studies based on high-loading electrodes rarely report more than 100 cycles due to the potential for serious current concentration even with a small amount of accumulating side reaction in the electrode. The world-class cycling performance of the 0.5 wt % graphene electrode originates from its simplified electrode structure and the chemical inertness of graphene that minimizes electrolyte decomposition.

Figures 6B, 6C:
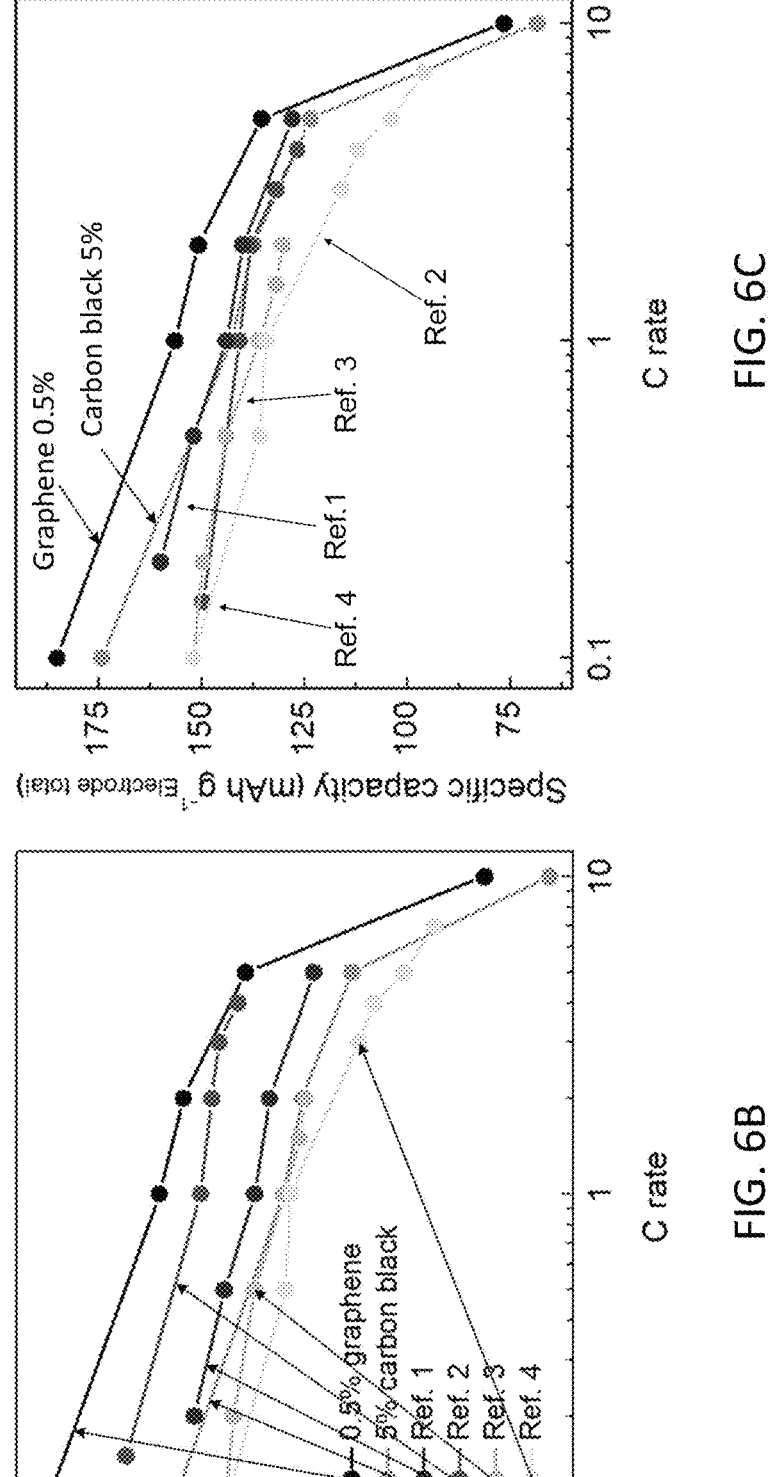

FIGS. 6A-6C compare the electrochemical results of this study to theoretical limits and the best previously reported LIB cathodes in the literature. In particular, the star-shaped markers in FIG. 6A represent the practically achievable volumetric and specific capacity limits of LIB electrodes based on the most common cathode materials: LiFePO$_4$ (LFP), LiCoO$_2$ (LCO), NCM, and NCA. These limits correspond to the theoretical specific capacities of the active materials, which can only be achieved at the electrode level without any binders or conductive additives, whereas the volumetric capacities assume the ideal crystal density with 25% porosity for lithium-ion diffusion, which is the experimentally observed porosity limit in extremely compressed electrodes. Among the plotted data points, nickel-rich cathodes show the most promise for high specific and volumetric capacities due to the advantages of Ni-redox chemistry. However, current electrode engineering strategies have been unable to achieve performance close to the theoretical limit of these high capacity cathode materials as shown for the round markers that depict the results of previous studies on NCA and NCM. On the other hand, the 0.5 wt % graphene electrode reaches about 98% of its volumetric and specific capacity limits.

Not only does the 0.5 wt % graphene electrode push the limits of volumetric and specific capacity, but it also achieves unprecedented rate performance. FIGS. 6B-6C show comparisons of the volumetric and specific rate capability, respectively, compared to previous best-in-class results for Ni-rich cathodes. For a reliable comparison, the results shown in FIGS. 6B-6C only include studies with an areal loading density of at least 7 mg/cm$^2$. The volumetric capacity of the 0.5 wt % graphene electrode (FIG. 6B) showed an increase of at least 10% at all current density ranges, with an exceptionally high volumetric capacity of 500 mAh cc$^{-1}$ being attained at a 5 C rate. Moreover, as shown in FIG. 6C, the total electrode specific capacity also delivered superior performance at all current densities. This superlative rate performance again confirms the exceptional electron and lithium-ion transport characteristics provided by electrodes based on conformal graphene coatings.

Conclusion

In the exemplary example/embodiment, a highly conformal graphene coating method based on the Pickering emulsion processing is disclosed. This methodology can likely be employed in a manufacturing setting due to its high scalability, throughput, and amenability to recycling. The resulting conformal graphene coating allows the amount of carbon conductive additive in LIB electrodes to be substantially reduced without compromising electronic transport pathways. Correspondingly, the polymer binder level can also be reduced, leading to an exceptionally high active material percentage and packing density. The resulting electrodes show unprecedentedly high practical volumetric and specific capacities that approach theoretical capacity limits at high areal loadings. Furthermore, the efficient electron and lithium-ion transport in these electrodes implies superlative rate capability, while the conformal graphene coating mitigates degradation pathways that result in exceptional cycle life. While shown here to be particularly effective for LIB electrodes, the Pickering emulsion processing scheme can likely be generalized for the coating of a diverse range of particles with graphene and related 2D materials.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1]. Armand, M. & Tarascon, J. M. Building better batteries. *Nature* 451, 652-657 (2008).

[2]. Lu, L., Han, X., Li, J., Hua, J. & Ouyang, M. A review on the key issues for lithium-ion battery management in electric vehicles. *J. Power Sources* 226, 272-288 (2013).

[3]. Lee, J. et al. Reversible $Mn^{2+}/Mn^{4+}$ double redox in lithium-excess cathode materials. *Nature* 556, 185-190 (2018).

[4]. Grimaud, A., Hong, W. T., Shao-Horn, Y. & Tarascon, J. M. Anionic redox processes for electrochemical devices. *Nat. Mater.* 15, 121 (2016).

[5]. Arai, H., Okada, S., Sakurai, Y. & Yamaki, J.-i. Reversibility of $LiNiO_2$ cathode. *Solid State Ion.* 95, 275-282 (1997).

[6]. Etacheri, V., Marom, R., Elazari, R., Salitra, G. & Aurbach, D. Challenges in the development of advanced Li-ion batteries: a review. *Energy Environ. Sci.* 4, 3243-3262 (2011).

[7]. Manthiram, A., Knight, J. C., Myung, S.-T., Oh, S.-M. & Sun, Y.-K. Nickel-rich and lithium-rich layered oxide cathodes: Progress and perspectives. *Adv. Energy Mater.* 6, 1501010 (2016).

[8]. Kim, J. et al. Prospect and reality of Ni-rich cathode for commercialization. *Adv. Energy Mater.* 8, 1702028 (2018).

[9]. Lee, J. et al. Unlocking the potential of cation-disordered oxides for rechargeable lithium batteries. *Science* 343, 519-522 (2014).

[10]. Zheng, H., Tan, L., Liu, G., Song, X. & Battaglia, V. S. Calendering effects on the physical and electrochemical properties of $Li[Ni_{1/3}Mn_{1/3}Co_{1/3}]O_2$ cathode. *J. Power Sources* 208, 52-57 (2012).

[11]. Ebner, M., Geldmacher, F., Marone, F., Stampanoni, M. & Wood, V. X-ray tomography of porous, transition metal oxide based lithium ion battery electrodes. *Adv. Energy Mater.* 3, 845-850 (2013).

[12]. Jabbour, L., Bongiovanni, R., Chaussy, D., Gerbaldi, C. & Beneventi, D. Cellulose-based Li-ion batteries: a review. *Cellulose* 20, 1523-1545 (2013).

[13]. Gaines, L. & Cuenca, R. *Costs of lithium-ion batteries for vehicles.* (Argonne National Lab., IL, US, 2000).

[14]. Dominko, R. et al. The role of carbon black distribution in cathodes for Li ion batteries. *J. Power Sources* 119-121, 770-773 (2003).

[15]. Li, Y. et al. Effects of particle size, electronic connectivity, and incoherent nanoscale domains on the sequence of lithiation in $LiFePO_4$ porous electrodes. *Adv. Mater.* 27, 6591-6597 (2015).

[16]. Singh, M., Kaiser, J. & Hahn, H. Thick electrodes for high energy lithium ion batteries. *J. Electrochem. Soc.* 162, A1196-A1201 (2015).

[17]. Lee, B.-S. et al. Analysis of rate-limiting factors in thick electrodes for electric vehicle applications. *J. Electrochem. Soc.* 165, A525-A533 (2018).

[18]. Ender, M., Joos, J., Carraro, T. & Ivers-Tiffée, E. Three-dimensional reconstruction of a composite cathode for lithium-ion cells. *Electrochem. Commun.* 13, 166-168 (2011).

[19]. Choi, W., Lahiri, I., Seelaboyina, R. & Kang, Y. S. Synthesis of graphene and its applications: A review. *Crit, Rev. Solid State* 35, 52-71 (2010).

[20]. Yi, M. & Shen, Z. A review on mechanical exfoliation for the scalable production of graphene. *J. Mater. Chem. A* 3, 11700-11715 (2015).

[21]. Kucinskis, G., Bajars, G. & Kleperis, J. Graphene in lithium ion battery cathode materials: A review. *J. Power Sources* 240, 66-79 (2013).

[22]. Chabot, V. et al. A review of graphene and graphene oxide sponge: material synthesis and applications to energy and the environment. *Energy Environ. Sci.* 7, 1564-1596 (2014).

[23]. Zhu, N. et al. Graphene as a conductive additive to enhance the high-rate capabilities of electrospun $Li_4Ti_5O_{12}$ for lithium-ion batteries. *Electrochim. Acta* 55, 5813-5818 (2010).

[24]. Su, F.-Y. et al. Could graphene construct an effective conducting network in a high-power lithium ion battery? *Nano Energy* 1, 429-439 (2012).

[25]. Bi, H. et al. Study of $LiFePO_4$ cathode modified by graphene sheets for high-performance lithium ion batteries. *Electrochim. Acta* 88, 414-420 (2013).

[26]. Belyaeva, L. A., van Deursen, P. M. G., Barbetsea, K. I. & Schneider, G. F. Hydrophilicity of graphene in water through transparency to polar and dispersive interactions. *Adv. Mater.* 30, 1703274 (2018).

[27]. Li, Z. et al. Effect of airborne contaminants on the wettability of supported graphene and graphite. *Nat. Mater.* 12, 925-931 (2013).

[28]. Liang, Y. T. & Hersam, M. C. Highly concentrated graphene solutions via polymer enhanced solvent exfoliation and iterative solvent exchange. *J. Am. Chem. Soc.* 132, 17661-17663 (2010).

[29]. Kim, J. et al. Graphene oxide sheets at interfaces. *J. Am. Chem. Soc.* 132, 8180-8186 (2010).

[30]. Kim, J.-W., Lee, D., Shum, H. C. & Weitz, D. A. Colloid surfactants for emulsion stabilization. *Adv. Mater.* 20, 3239-3243 (2008).

[31]. Aggour, Y. A. Thermal decomposition behaviour of ethyl cellulose grafted copolymers in homogeneous media. *J. Mater. Sci.* 35, 1623-1627 (2000).

[32]. Nan, H. Y. et al. The thermal stability of graphene in air investigated by Raman spectroscopy. *J. Raman Spectrosc.* 44, 1018-1021 (2013).

[33]. Secor, E. B. et al. Enhanced conductivity, adhesion, and environmental stability of printed graphene inks with nitrocellulose. *Chem. Mater.* 29, 2332-2340 (2017).

[34]. Qiu, X.-Y. et al. Reprint of "Investigation of layered $LiNi_{1/3}Co_{1/3}Mn_{1/3}O_2$ cathode of lithium ion battery by electrochemical impedance spectroscopy". *J. Electroanal. Chem.* 688, 393-402 (2013).

[35]. Du, K., Huang, J., Cao, Y., Peng, Z. & Hu, G. Study of effects on $LiNi_{0.8}Co_{0.15}Al_{0.05}O_2$ cathode by $LiNi_{1/3}Co_{1/3}Mn_{1/3}O_2$ coating for lithium ion batteries. *J. All. Compd.* 574, 377-382 (2013).

[36]. Lee, M.-J. et al. The role of nanoscale-range vanadium treatment in $LiNi_{0.8}Co_{0.15}Al_{0.05}O_2$ cathode materials for Li-ion batteries at elevated temperatures. *J. Mater. Chem. A* 3, 13453-13460 (2015).

[37]. Sharifi-Asl, S. et al. Anti-oxygen leaking $LiCoO_2$. *Adv. Funct. Mater.* 29, 1901110 (2019).

[38]. Zheng, H., Li, J., Song, X., Liu, G. & Battaglia, V. S. A comprehensive understanding of electrode thickness effects on the electrochemical performances of Li-ion battery cathodes. *Electrochim. Acta* 71, 258-265 (2012).

[39]. Liu, M.-H., Jen, C.-W., Chen, J.-M. & Liao, S.-C. Improved electrochemical performance of Ni-rich cathode materials via Al gradient doping. *Int. J. Electrochem. Sci.* 13, 4350-4366 (2018).

[40]. Vu, D.-L., Choi, J.-Y., Kim, W.-B., Lee, J. J. & Lee, J.-W. Layered $LiNi_{0.8}Co_{0.1}Mn_{0.1}O_2$ prepared through calcination in air with preoxidized precursor. *J. Electrochem. Soc.* 164, A2670-A2676 (2017).

[41]. Zheng, J., Kan, W. H. & Manthiram, A. Role of Mn content on the electrochemical properties of nickel-rich layered $LiNi_{0.8-x}Co_{0.1}Mn_{0.1+x}O_2$ ($0.0 \leq x \leq 0.08$) cathodes for lithium-ion batteries. *ACS Appl. Mater.* 7, 6926-6934 (2015).

[42]. Yoon, S. et al. Method of preparation for particle growth enhancement of $LiNi_{0.8}Co_{0.15}Al_{0.05}O_2$. *Electrochem. Solid State Lett.* 12, A211-A214 (2009).

[43]. Liang, M. et al. Improved performances of $LiNi_{0.8}Co_{0.15}Al_{0.05}O_2$ material employing $NaAlO_2$ as a new aluminum source. *ACS Appl. Mater.* 9, 38567-38574 (2017).

[44]. Vu, D.-L. & Lee, J.-w. Properties of $LiNi_{0.8}Co_{0.1}Mn_{0.1}O_2$ as a high energy cathode material for lithium-ion batteries. *Korean J. Chem. Eng.* 33, 514-526 (2016).

[45]. Wu, G. & Zhou, Y. $TiP_2O_7$-coated $LiNi_{0.8}Co_{0.15}Al_{0.05}O_2$ cathode materials with improved thermal stability and superior cycle life. *J. Energy Chem.* 28, 151-159 (2019).

[46]. Zhamu, A. et al., Graphene-enhanced cathode materials for lithium batteries, U.S. Pat. No. 8,691,441B2, (2010).

[47]. Zhamu, A. et al., Nano graphene reinforced nanocomposite particles for lithium battery electrodes, US20100143798A1, (2008).

[48]. Adamson, D. H. et al., Graphene/graphite polymer composite foam derived from emulsions stabilized by graphene/graphite kinetic trapping, WO2015184155A1, (2015).

[49]. Miller, S. A., Coating a substance with graphene, U.S. Pat. No. 8,691,335B2, (2010).

[50]. Mao, Z & Chahar, B., Carbon-coated silicon particle power as the anode material for lithium ion batteries and the method of making the same, EP1702375B1, (2003).

[51]. Mo, R. et al., Facile synthesis of nanocrystalline $LiFePO_4$/graphene composite as cathode material for high power lithium ion batteries, Electrochimica Acta, 130, 594-599, (2014).

[52]. Li, N et al., The preparation and graphene surface coating $NaTi_2(PO_4)_3$ as cathode material for lithium ion batteries, Applied Surface Science, 399, 624-629, (2017).

[53]. Chen, K. et al., Comprehensive Enhancement of Nanostructured Lithium-Ion Battery Cathode Materials via Conformal Graphene Dispersion, Nano Letters, 17, 4, 2539-2546, (2017).

What is claimed is:

1. A composite material, comprising:

graphene; active material particles; and an annealation product of ethyl cellulose (EC), wherein said composite material is fabricated by:

forming an emulsion mixture of the active material particles and graphene emulsion droplets, wherein graphene emulsion droplets contain immiscible first and second solvents, a solid-state emulsifier of said graphene, and said EC, wherein the first and second solvents are adapted such that the second solvent resides in an interior of the graphene emulsion droplets with the first solvent as an exterior solvent, wherein the active material particles reside in the interior of the graphene emulsion droplets; wherein a boiling point of the second solvent is lower than that of the first solvent; and drying the emulsion mixture with subsequent evaporation of the second solvent and the first solvent through fractional distillation to form a composite mixture having the active material particles conformally coated with said graphene and said EC; and thermal annealing the composite mixture at a temperature in an oxidizing environment to decompose the majority of EC, thereby resulting in said composite material having the annealation product of said EC comprising amorphous carbon with sp²-carbon content that facilitates electron transport between graphene flakes, wherein each surface of the active material particles is conformally coated with said graphene.

2. The composite material of claim 1, wherein a weight ratio of said graphene to said EC is in a range from about 1:1 to about 1:3.

3. The composite material of claim 1, wherein a weight ratio of said graphene to the active material particles is in a range from about 1:400 to about 1:100.

4. The composite material of claim 1, wherein the temperature is in a range of about 150-350° C., preferably, about 250° C.

5. The composite material of claim 1, wherein an average size of the graphene emulsion droplets changes with changing a volume ratio of the first solvent to the second solvent, and a concentration of said graphene in the base solution.

6. The composite material of claim 5, wherein the volume ratio of the first solvent to the second solvent is in a range from about 5:4 to about 5:1.

7. The composite material of claim 5, wherein the average size of the graphene emulsion droplets is reduced with decreasing content of the second solvent, and is less than about 5 μm at the 5:1 volume ratio of the first solvent to the second solvent.

8. The composite material of claim 1, wherein the first solvent comprises acetonitrile, heptane, water, or acetic acid and the second solvent comprises pentane, cyclohexane, acetonitrile, benzene, hexane, or chloroform.

9. The composite material of claim 8, wherein the first solvent comprises acetonitrile having the boiling point of 82° C., and the second solvent comprises hexane having the boiling point of 68° C.

10. A composite material, comprising:

graphene;

active material particles, wherein each surface of the active material particles is conformally coated with said graphene; and amorphous carbon with sp²-carbon content that facilitates electron transport between graphene flakes, wherein the amorphous carbon is an annealation product of ethyl cellulose, wherein said each surface of the active material particles is conformally coated with said graphene by a Picking emulsion process.

11. A composite material, comprising:

graphene;

active material particles, wherein each surface of the active material particles is conformally coated with said graphene; and amorphous carbon with sp²-carbon content that facilitates electron transport between graphene flakes, wherein the amorphous carbon is an annealation product of ethyl cellulose, wherein a weight ratio of said graphene to the active material particles is in a range from about 1:400 to about 1:100.

12. The composite material of claim 11, wherein said graphene comprises solution-exfoliated graphene.

13. The composite material of claim 11, wherein the active material comprises lithium cobalt oxide, lithium iron phosphate, lithium manganese oxide, lithium nickel manganese cobalt oxide, lithium nickel cobalt aluminum oxide, or a combination thereof.

14. The composite material of claim 13, wherein the active material comprises nickel-rich lithium oxides.

15. The composite material of claim 14, wherein the active material comprises $LiNi_{0.8}Co_{0.15}Al_{0.05}O_2$ (NCA), $LiNiO_2$ (LNO), $LiMn_{1.5}Ni_{0.5}O_4$ (LMNO), $LiNi_xMn_yCO_zO_2$ (NMC), $LiNi_{0.8}Co_{0.2}O_2$ (LNCO), or $Li_wNi_xMn_yCO_zO_2$ (lithium-rich NMC), where w>1, x+y+z=1.

16. The composite material of claim 15, wherein the active material is doped with elements including Al, B, Zr, Nb, Fe, Cr, Cu, Mo, W, and/or V.

17. An electrode for an electrochemical device, comprising:

a composite material comprising graphene, active material particles, and amorphous carbon with sp²-carbon content that facilitates electron transport between graphene flakes, wherein the amorphous carbon is an annealation product of ethyl cellulose, wherein each surface of the active material particles is conformally coated with said graphene, wherein said each surface of the active material particles is conformally coated with said graphene by a Picking emulsion process.

18. An electrode for an electrochemical device, comprising:

a composite material comprising graphene, active material particles, and amorphous carbon with sp²-carbon content that facilitates electron transport between graphene flakes, wherein the amorphous carbon is an annealation product of ethyl cellulose, wherein each surface of the active material particles is conformally coated with said graphene, wherein the weight ratio of said graphene to the active material particles is in a range from about 1:400 to about 1:100.

19. An electrode for an electrochemical device, comprising:

a composite material comprising graphene, active material particles, and amorphous carbon with sp²-carbon content that facilitates electron transport between graphene flakes, wherein the amorphous carbon is an annealation product of ethyl cellulose, wherein each surface of the active material particles is conformally coated with said graphene, wherein the electrode with only 0.5 wt % graphene achieves an active material areal loading of greater than about 10 mg cm$^{-2}$, and at least about 98% volumetric and specific capacities of the theoretically limits of the active material.

20. The electrode of claim 19, wherein the electrode with only 0.5 wt % graphene retains about 91.5% of its initial volumetric capacity over 100 cycles, and maintains about 99.7% Coulombic efficiency.

21. The electrode of claim 20, wherein the electrode with only 0.5 wt % graphene retains about 70% of its initial volumetric capacity over 250 cycles.

* * * * *